US010452707B2

(12) United States Patent
Morate et al.

(10) Patent No.: US 10,452,707 B2
(45) Date of Patent: Oct. 22, 2019

(54) PRODUCT AUDITING IN POINT-OF-SALE IMAGES

(71) Applicant: The Nielsen Company (US), LLC, New York, NY (US)

(72) Inventors: Diego Garcia Morate, Valladolid (ES); Antonio Hurtado Garcia, Valladolid (ES); Jorge Martin Martin, Valladolid (ES); Miguel Garcia Carranza, Valladolid (ES)

(73) Assignee: The Nielsen Company (US), LLC, New York, NY (US)

( * ) Notice: Subject to any disclaimer, the term of this patent is extended or adjusted under 35 U.S.C. 154(b) by 383 days.

(21) Appl. No.: 14/787,935

(22) PCT Filed: Aug. 31, 2015

(86) PCT No.: PCT/IB2015/001844
§ 371 (c)(1),
(2) Date: Jul. 20, 2016

(87) PCT Pub. No.: WO2017/037493
PCT Pub. Date: Mar. 9, 2017

(65) Prior Publication Data
US 2017/0061416 A1 Mar. 2, 2017

(51) Int. Cl.
*G06Q 30/00* (2012.01)
*G06F 16/51* (2019.01)
(Continued)

(52) U.S. Cl.
CPC .......... *G06F 16/51* (2019.01); *G06F 16/5854* (2019.01); *G06Q 10/087* (2013.01)

(58) Field of Classification Search
CPC .......... G06K 9/00; G06Q 30/06; G06T 19/00; H04M 1/725
(Continued)

(56) References Cited

U.S. PATENT DOCUMENTS 4,272,580 A 6/1981 de Zepeda-Bermudez
5,893,076 A 4/1999 Hafner et al.
(Continued)

FOREIGN PATENT DOCUMENTS

JP 2001088912 4/2001
JP 2002312652 10/2002

OTHER PUBLICATIONS

Author Unknown, "Product, Services, and Branding Strategy," Chapter 8, PowerPoint Presentation, retrieved from [URL:http://www.slideshare.net] on Jul. 30, 2011, 28 pages.
(Continued)

*Primary Examiner* — Oluseye Iwarere
(74) *Attorney, Agent, or Firm* — Hanley, Flight & Zimmerman, LLC

(57) ABSTRACT

Examples methods, apparatus/systems and articles of manufacture for auditing point-of-sale images are disclosed herein. Example methods disclosed herein include comparing a region of interest of an image displayed via a user interface with a plurality of reference product images stored in a database to identify a plurality of candidate product images from the plurality of reference product images as potential matches to a first product depicted in the image. For example, the candidate product images are associated with respective confidence levels indicating respective likelihoods of matching the first product. Disclosed example methods also include displaying, via the user interface, the candidate product images simultaneously with the image in a manner based on the respective confidence levels, and automatically selecting a first one of the candidate product images as matching the first product based on the respective confidence levels.

20 Claims, 11 Drawing Sheets

(51) Int. Cl.
*G06F 16/583* (2019.01)
*G06Q 10/08* (2012.01)

(58) Field of Classification Search
USPC .......... 1/1; 705/26.61, 28; 345/633; 328/181
See application file for complete search history.

(56) References Cited

U.S. PATENT DOCUMENTS

| | | | |
|---|---|---|---|
| 6,026,377 A | 2/2000 | Burke | |
| 6,205,431 B1 | 3/2001 | Willemain et al. | |
| 6,281,874 B1 | 8/2001 | Sivan et al. | |
| 6,304,855 B1 | 10/2001 | Burke | |
| 6,381,510 B1 | 4/2002 | Amidhozour et al. | |
| 6,561,417 B1 | 5/2003 | Gadd | |
| 6,577,346 B1 | 6/2003 | Perlman | |
| 6,590,997 B2 | 7/2003 | Rhoads | |
| 6,633,651 B1 | 10/2003 | Hirzalla et al. | |
| 6,708,156 B1 | 3/2004 | Gonten | |
| 7,080,778 B1 | 7/2006 | Kressin et al. | |
| 7,092,929 B1 | 8/2006 | Dvorak et al. | |
| 7,168,618 B2 | 1/2007 | Schwartz | |
| 7,222,786 B2 | 5/2007 | Renz et al. | |
| 7,353,188 B2 | 4/2008 | Yim et al. | |
| 7,422,244 B1 | 9/2008 | Redmond et al. | |
| 7,516,128 B2 | 4/2009 | Colby et al. | |
| 7,584,016 B2 | 9/2009 | Weaver | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,339,451 B2 | 12/2012 | Wang et al. | |
| 8,390,648 B2* | 3/2013 | Ptucha | G06T 11/60 |
| | | | 345/638 |
| 8,423,949 B2 | 4/2013 | Furumoto | |
| 8,429,004 B2 | 4/2013 | Hamilton et al. | |
| 8,433,142 B2 | 4/2013 | Deng | |
| 8,559,766 B2 | 10/2013 | Tilt et al. | |
| 8,630,924 B2 | 1/2014 | Groenvelt et al. | |
| 8,660,355 B2* | 2/2014 | Rodriguez | G06K 9/00973 |
| | | | 382/118 |
| 8,908,903 B2 | 12/2014 | Deng et al. | |
| 8,917,902 B2 | 12/2014 | Hicks | |
| 8,922,662 B1* | 12/2014 | Fu | H04N 5/23264 |
| | | | 348/208.12 |
| 9,135,491 B2 | 9/2015 | Morandi et al. | |
| 9,270,899 B1* | 2/2016 | Ivanchenko | G06T 7/11 |
| 9,280,560 B1* | 3/2016 | Dube | G06F 17/30247 |
| 9,355,336 B1* | 5/2016 | Jahagirdar | G06K 9/6217 |
| 9,390,315 B1* | 7/2016 | Yalniz | G06K 9/4609 |
| 9,424,461 B1* | 8/2016 | Yuan | G06K 9/00201 |
| 9,530,251 B2* | 12/2016 | Loxam | G06T 19/006 |
| 9,582,482 B1* | 2/2017 | Sharifi | G06F 17/241 |
| 9,646,419 B2* | 5/2017 | Bostick | G02B 27/0172 |
| 9,652,838 B1* | 5/2017 | Manmatha | G06T 7/0004 |
| 2003/0187677 A1 | 10/2003 | Malireddy et al. | |
| 2004/0012631 A1 | 1/2004 | Skorski | |
| 2004/0258274 A1 | 12/2004 | Brundage et al. | |
| 2006/0116927 A1 | 6/2006 | Miller, III et al. | |
| 2006/0153296 A1 | 7/2006 | Deng | |
| 2006/0237532 A1 | 10/2006 | Scott-Leikach et al. | |
| 2008/0001753 A1 | 1/2008 | Claudatos et al. | |
| 2008/0068622 A1 | 3/2008 | Deng et al. | |
| 2008/0140478 A1 | 6/2008 | Goldberg et al. | |
| 2008/0170755 A1 | 7/2008 | Nasser et al. | |
| 2008/0198001 A1 | 8/2008 | Sarma et al. | |
| 2008/0306787 A1 | 12/2008 | Hamilton et al. | |
| 2009/0059270 A1* | 3/2009 | Opalach | G06K 9/00 |
| | | | 358/1.15 |
| 2009/0060349 A1* | 3/2009 | Linaker | G06K 9/00664 |
| | | | 382/209 |
| 2009/0063306 A1* | 3/2009 | Fano | G06K 9/00 |
| | | | 705/28 |
| 2009/0063307 A1* | 3/2009 | Groenovelt | G06Q 10/087 |
| | | | 705/28 |
| 2009/0121017 A1 | 5/2009 | Cato et al. | |
| 2009/0123069 A1 | 5/2009 | Deng et al. | |
| 2009/0192921 A1 | 7/2009 | Hicks | |
| 2009/0204512 A1 | 8/2009 | Connell, II et al. | |
| 2009/0240735 A1 | 9/2009 | Grandhi et al. | |
| 2009/0257620 A1 | 10/2009 | Hicks | |
| 2010/0138281 A1 | 6/2010 | Zhang et al. | |
| 2010/0171826 A1 | 7/2010 | Hamilton et al. | |
| 2010/0217678 A1* | 8/2010 | Goncalves | G06Q 20/203 |
| | | | 705/22 |
| 2010/0262460 A1 | 10/2010 | Brown et al. | |
| 2011/0011936 A1 | 1/2011 | Morandi et al. | |
| 2011/0055054 A1 | 3/2011 | Glasson | |
| 2011/0105194 A1 | 5/2011 | Wang et al. | |
| 2011/0184972 A1 | 7/2011 | Ard et al. | |
| 2011/0243459 A1 | 10/2011 | Deng | |
| 2013/0051667 A1 | 2/2013 | Deng et al. | |
| 2014/0337174 A1* | 11/2014 | Lin | G06Q 30/0623 |
| | | | 705/26.61 |
| 2015/0055851 A1* | 2/2015 | Nykyforov | G06K 9/342 |
| | | | 382/141 |
| 2015/0086070 A1 | 3/2015 | Deng et al. | |
| 2015/0139555 A1 | 5/2015 | Jung et al. | |
| 2015/0163345 A1* | 6/2015 | Cornaby | G06F 3/04847 |
| | | | 345/633 |
| 2015/0220786 A1* | 8/2015 | Folkens | G06F 16/5846 |
| | | | 382/181 |
| 2015/0220787 A1* | 8/2015 | Folkens | G06F 16/5838 |
| | | | 382/103 |
| 2015/0317620 A1 | 11/2015 | Morandi et al. | |
| 2015/0363625 A1* | 12/2015 | Wu | G06K 7/146 |
| | | | 382/203 |
| 2016/0125265 A1 | 5/2016 | Xie et al. | |
| 2016/0275441 A1* | 9/2016 | Barber | G06K 9/6202 |
| 2016/0283595 A1* | 9/2016 | Folkens | G06F 3/013 |
| 2016/0342624 A1* | 11/2016 | Mazur | G06Q 30/0241 |
| 2016/0342863 A1* | 11/2016 | Kwon | G06K 9/4647 |
| 2017/0061416 A1* | 3/2017 | Morate | G06Q 10/087 |
| 2017/0178226 A1* | 6/2017 | Graham | G06Q 30/0643 |
| 2017/0178335 A1* | 6/2017 | Pavani | G06T 1/0007 |

OTHER PUBLICATIONS

Barba, Ronald (Ed.), "Can Slyce Take Down Amazon Flow in Image Recognition Shopping?", tech.co, Apr. 7, 2014, 5 pages.
Leukel, Joerg, "Automating Product Classification: the Impact of Standardization," IADIS International Conference e-Society, 2004, 8 pages.
Mair et al., "Adaptive and Generic Corner Detection Based on the Accelerated Segment Test," Proceedings of the 11th European Conference on Computer Vision, Sep. 5-11, 2010, 14 pages.
Murdoch, Peter L., "Sentry Technology Signs LOI With Orions Digital," Mar. 15, 2011, retrieved from [URL: http://finance.yahoo.com/news/Sentry-Technology-Signs-LO1-iw-2384033886.html?x=O&] on Jul. 30, 2011, 2 pages.
Probst et al., "Extracting and Using Attribute-Value Pairs from Product Descriptions on the Web," From Web to Social Web: Discovering and Deploying User and Content Profiles, 2007, (20 pages).
International Search Report and Written Opinion, issued by the International Searching Authority in connection with International patent application No. PCT/IB2015/001844, dated May 26, 2016, 16 pages.
International Bureau, "International Preliminary Report on Patentability," mailed in connection with PCT Application No. PCT/IB2015/001844, dated Mar. 15, 2018, 12 pages.
"3D Camera-Create 3D Photos with iPhone and iPod touch," http://www.helpline3d.com/industry-updates/1331-3d-camera-create-3d-photos-iphone-ipo, accessed on Jul. 24, 2011 (2 pages).
Goldstein, Mark, 3D Photos for iPhone and iPod Touch, PhotographyBLOG, http://www.photographyblog.com/news/3d_photos_for_iphone_and_ipod_touch/, accessed on Jul. 24, 2011 (3 pages).
Primdahl, Keith et. al, "Change Detection From Multiple Camera Images Extended to Non-Stationary Cameras," in Proceedings of Field and Service Robotics 2005 (FSR05) ( online version, 10 pages).

(56) References Cited

OTHER PUBLICATIONS

Murdoch, Peter L., "Sentry Technology Signs LOI With Orions Digi-tal," Sentry Technology Corporation,Yahoo! Finance, https://finance.yahoo.com/news/Sentry-Technology-Signs-LOI-iw-2384033886.html?x=0&, Ronkonkoma, NY, on Mar. 25, 2011 (2 pages).

Chan, Christine, "See How You've Changed Over Time in a Time Lapse With Everyday," http://appadvice.com/appnn/2011/03/quickadvice-everyday, Mar. 25, 2011 ( 11 pages).

* cited by examiner

PRODUCT AUDITING IN POINT-OF-SALE IMAGES

FIELD OF THE DISCLOSURE

This disclosure relates generally to point-of-sale images and, more particularly, to product auditing in point-of-sale images.

BACKGROUND

Image recognition may be used to identify consumer packaged goods for a variety of purposes. For example, when performing an in-store shelf audit, a market research firm may use an image recognition application to identify the products displayed on store shelves. As another example, a merchant may offer an image recognition application to consumers to facilitate comparison shopping. In some examples, image recognition applications or programs attempt to identify products shown in pictures or images of a shelf taken at a point-of-sale. After the image recognition application or program has analyzed the point-of-sale image, an auditor manually reviews the results to verify the accuracy and/or make corrections. An auditor typically has to adjust or modify information in the results.

DETAILED DESCRIPTION

Figure 1:
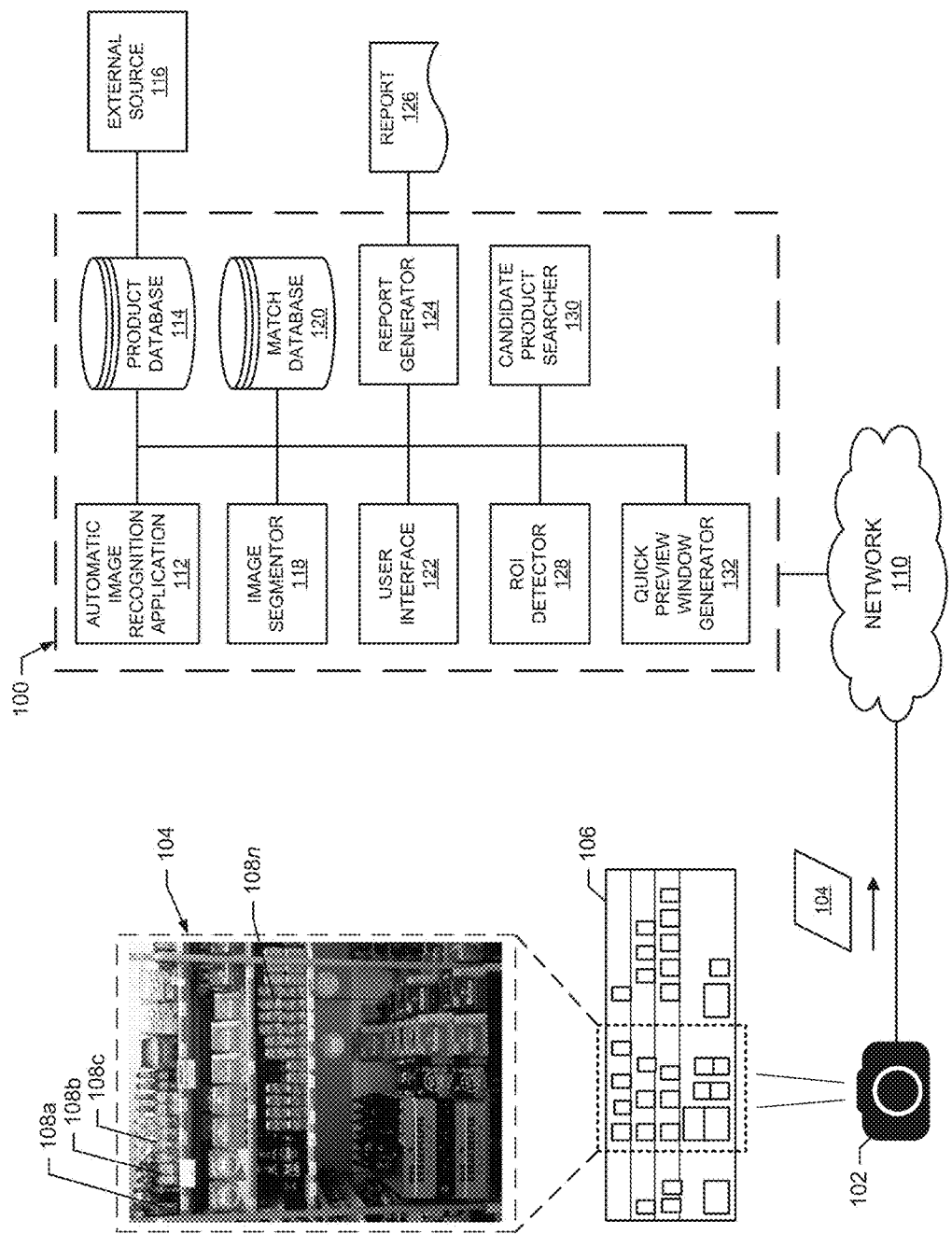
FIG. 1 illustrates an example auditing system constructed in accordance with the teaching of this disclosure to perform product auditing in point-of-sale images.

Disclosed herein are example auditing methods, apparatus/systems and articles of manufacture that may be implemented to perform product auditing of a point-of-sale image. Example systems and methods disclosed herein can significantly reduce the amount of human intervention required to review results of an automatic image recognition engine. Disclosed example systems and methods enable a user to identify a region of interest (ROI) in a segmentation of an image containing a product that has not been recognized by the automatic image recognition engine. As used herein, an ROI is an area, a portion, a location, etc. of an image depicting, or identified as possibly depicting, one or more product(s) and/or other item(s), element(s), etc. of interest. Such disclosed example systems and methods produce a list of candidate products with assigned confidence levels. With this information, an auditor can quickly determine which product is to be matched or assigned with the product in the ROI. The disclosed example systems and methods also enable an auditor to quickly modify or adjust product information associated with a product detected by the automatic image recognition application, further reducing the amount of time required for reviewing and verifying auditing information generated by an automatic image recognition engine. As a result, the disclosed example systems and methods can significantly reduce labor costs associated with the process of manually identifying and correcting unrecognized and/or incorrectly labeled products in an image processed by an automatic image recognition engine.

In general, market research entities (MREs) and/or merchants (e.g., wholesalers, club stores, retailers, e-commerce retailers) offer services based on recognizing consumer packaged goods (e.g., products, items, objects, etc.) from images captured by image capturing devices (e.g., cameras, smartphones, tablets, video recorders, etc.). For example, an MRE may provide point-of-sale (e.g., shelf) auditing services to marketers, manufacturers, merchants and/or advertisers to help determine if, for example, display locations of products and/or display quality requirements (e.g., the goods are facing the correct orientation, the shelf is fully stocked, etc.) are being met. MRE and/or merchants typically use an automatic image recognition application (e.g., program, software, algorithm) that analyzes a point-of-sale image and attempts to detect and identify the products in the point-of-sale image.

Some prior automatic image recognition applications generate a segmented image, also referred to as a segmentation, which shows the locations and the names of the products recognized by the automatic image recognition application over the top (e.g., overlaid) the image. In some examples, the segmented image includes a plurality of frames (e.g., objects, squares, rectangles) overlaid on top of the image, which show (e.g., indicate) the boundaries of the products detected in the image. The frames include the names of the respective products detected during the automatic image recognition process. As used herein, a frame is a graphical object (e.g., a shape, such as a rectangle, a square, a circle, an oval, etc., and/or a boundary, an icon, etc.) displayed over or otherwise with an image to indicate a location, region, etc. of a recognized product, item, element, etc. and/or an ROI in the image.

Although generally effective in most situations, some prior automatic image recognition applications fail to detect all of the products in the image and/or incorrectly identify products. As such, to ensure high accuracy output, an auditor (e.g., a user, an operator, a technician, etc.) manually reviews the segmented image to verify that all of the products in the image have been detected and/or that all of the products are correctly identified. In particular, this process may be separated into two tasks: (1) identifying regions of interest (ROI), which are areas where products that still need to be segmented appear (e.g., were not detected by the automatic image recognition application), and (2) labeling the products in each ROI. In some examples, labeling the products involves manually searching through a database containing thousands of products and then assigning an item number (SKU) and/or International Article Number (EAN) code to the area once a reference product is located. This process of manually reviewing thousands of products in a database and assigning SKU/EAN codes requires significant time and experience on behalf of the auditor.

Example auditing systems and methods disclosed here enable a MRE, for example, to perform product auditing of a point-of-sale image. In particular, disclosed herein are example methods and systems that enable an auditor to more quickly and efficiently verify and update the results of a segmented image produced by an automatic image recognition application. In some examples disclosed herein, an auditor may identify (e.g., highlight) a region of interest (ROI) (e.g., an area) in the segmented image having one or more products that were not detected by the automatic image recognition application. The example system detects the ROI identified by the auditor and performs a confidence search (e.g., via an algorithm), where the ROT is compared to reference images of products stored in a product database. The example auditing system produces or generates a list of candidate products that may be in the ROI identified by the auditor. In some examples, the candidate products are assigned confidence levels (e.g., a score, a value), which indicate the likelihoods or degrees of certainty the respective candidate products are the same as the product in the ROI. In some examples, the candidate products are displayed simultaneously as the ROI (e.g., adjacent to the ROI and/or on top of the segmented image). The candidate products may be sorted by their receptive confidence levels. In some examples, the candidate products are displayed in a window or user interface that is activated by the auditor. For example, after the auditor identifies the ROI and the confidence search is performed, the auditor may select the ROI to view the candidate products in a quick preview window adjacent the ROI. In some examples, the candidate product having the highest confidence level is automatically assigned (e.g., matched) to the product in the ROI. However, if the candidate product assigned to the product in the ROI is incorrect, the auditor can easily review the other candidate products and determine (e.g., with a level of confidence or degree of certainty) which product is to be assigned to the product in the ROI.

In some examples, the confidence search may be performed on an image that has not been analyzed by an automatic image recognition application. For example, an auditor may desire to identify only a few products in a point-of-sale image. Instead of waiting for the automatic image recognition application to process the entire image (e.g., which may take a substantial amount of time), the auditor may identify a particular ROI in the image. In such an example, the auditing system performs a confidence search to identify one or more candidate products, assigns confidence level(s) to the candidate product(s), and displays the candidate product(s) to the auditor. This abbreviated process is relatively fast compared to a full automatic image recognition process that analyzes the entire image. Additionally, by displaying the candidate products with their confidence levels (e.g., or by sorting the candidate products by their confidence levels), the example systems and methods enable relatively new or less experienced auditors to more accurately and efficiently review a segmented image. Therefore, the example system and methods reduce the skill or experience required by auditors reviewing segmented images.

An example confidence search disclosed herein includes detecting corners of a region of interest. In some examples, an optimal accelerated segment test (OAST) is used to detect the corners. The example confidence search includes extracting features from the detected corners of the region of interest. To compare the region of interest against a reference product image (e.g., a pattern, a captured image, etc.) of a reference product, the confidence search also detects corners of the reference image and extracts features from the corners of the reference image. The example confidence search compares the features of the region of interest and the features of the reference image to determine similarities or relationships between the features. Once the relationships between the features are obtained, a dominant transformation projection (e.g., a mathematical formula or function) is identified that can transform the features from the region of interest to the features of the reference image, or vice versa. In some examples, the dominant transformation projection represents the most important or influential match/relationship between the features of the region of interest and the features of the reference image. In some examples, the confidence search then creates or calculates a confidence level (e.g., a score, a value) for the reference product represented by the reference product image. In some examples, the confidence level is based on a number of inliers (i.e., the number of features between the ROI and the reference product image that are compatible with the relationship). In other words, the more inliers captured, the higher the confidence level. This confidence search process may be repeated for other reference images associated with the same and/or other reference products stored in a product database. In some examples, after analyzing multiple reference products, the reference products are sorted by the confidence levels and presented to the auditor as candidate products. In some examples, only reference products having confidence levels above a threshold are considered candidate products.

In some examples, as mentioned above, an automatic image recognition application may incorrectly label a product in a segmented image. To decrease the amount of effort spent by an auditor correcting the label, example auditing systems disclosed herein enable an auditor to select a labeled product and display a list of candidate products. In some examples, the list of candidate products is displayed in a quick preview window, which is displayed when an auditor selects a particular frame of a product in the segmented image. The auditor can then easily select a different product, which is then matched or assigned to the product in the segmented image. In some examples, the candidate products are based on reference products identified during the automatic recognition process as potentially matching the corresponding product.

Additionally or alternatively, in some examples, the quick preview window may display product information associated with a product in a frame in the segmented image selected by the auditor. The selected frame may have been generated by an example automatic image recognition application or by the auditor via an example ROI identification process disclosed herein. The example quick preview window displays product information associated with the product identified in the particular frame. The product information may include an image (e.g., a thumbnail) of the recognized product, a type or name of the recognized product, a view or position (e.g., frontal, side, rear, etc.) of the recognized product, a layout of the recognized product (e.g., a number of rows by a number of columns), metric warnings with respect to the recognized product (e.g., problems with the segmentation), an indication of whether the recognized product is in stock, an indication of whether the recognized product is on a pallet, a price of the recognized product, a range of the price of the recognized product, etc. The product information may be changed by the auditor if it is incorrect, which then updates the record corresponding to the product in the particular frame. In some examples, the quick preview window displays a listing of the candidate products associated with the product in the selected frame. In some examples, the quick preview window includes a search bar that enables an auditor to search the product database by typing a word (e.g., a name of a product, a brand, a type of product) into the search bar.

Example methods disclosed herein include comparing a region of interest of a first image displayed via a user interface with reference product images stored in a database to identify candidate product images from the reference product images as potential matches to a first product depicted in the first image. In such examples, the candidate product images are associated with respective confidence levels indicating respective likelihoods of matching the first product. Such disclosed example methods also include displaying, via the user interface, the candidate product images simultaneously with the first image in a manner based on the respective confidence levels. Such disclosed example methods further include automatically selecting a first one of the candidate product images as matching the first product based on the respective confidence levels.

In some disclosed examples, comparing the region of interest with the reference product images includes detecting first corners of the region of interest, extracting first features from the detected first corners of the region of interest, detecting second corners of a first reference product image of the reference product images, extracting second features from the detected second corners, determining relations between the first features and the second features, and determining a dominant transformation projection between the region of interest and the first reference product image based on the relations. In some such disclosed examples, at least one of the first corners or the second corners is detected using an optimal accelerated segment test. In some disclosed examples, the dominant transformation projection is determined using a random sample consensus (RANSAC) algorithm. Some disclosed example methods further include determining a number of inliers of the first features based on the dominant transformation projection and determining a first one of the respective confidence levels associated with the first reference product image based on the number of the inliers.

In some disclosed examples, comparing the region of interest of the first image with the reference product images to identify the candidate product images includes assigning the respective confidence levels to the reference product images and comparing the respective confidence levels associated with the reference product images to a threshold. In some disclosed examples, the first image is a segmented image including one or more frames corresponding to respective products identified in the first image with an automatic image recognition process. In some such disclosed examples, the one or more frames includes respective product names overlaying the respective products identified in the respective frames.

Additionally or alternatively, some disclosed example methods further include at least one of creating a record or updating the record to indicate the first product matched the first one of the candidate product images. Some such disclosed example methods also include displaying product information corresponding to the first one of the candidate product images. In some such disclosed examples, the product information includes at least one of a name of a reference product associated with the first candidate reference image, a view or position of the reference product, a layout of the reference product, an indication of whether the reference product is in stock, an indication of whether the reference product is on a pallet or a price of the reference product.

In some disclosed examples, the candidate product images are displayed in order of the respective confidence levels. Some disclosed example methods further include displaying values representative of the respective confidence levels adjacent to the candidate product images. Some disclosed example methods also include displaying the first one of the candidate product images in a manner indicating the first one of the candidate product images has been selected as being matched to the first product.

Other example methods disclosed herein, additionally or alternatively, include displaying, via a user interface, a segmentation of an image depicting products, the segmentation generated by an automatic image recognition application. The segmentation includes a first frame overlaying the image and defining a first location of a first product identified by the automatic image recognition process. Such disclosed example methods also include displaying, in response to a user selection of the first frame, a first preview window simultaneously with the first frame via the user interface. The first preview window includes first product information associated with the first product. Such disclosed example methods further include updating a first product record associated with the first product based on a modification made, via the user interface, to the first product information displayed in the first preview window.

In some disclosed examples, the first product information includes at least one of an image of the first product, a name of the first product, a view or position of the first product, a layout of the first product, an indication of whether the first product is in stock, an indication of whether the first product is on a pallet or a price of the first product. In some such disclosed examples, the layout of the first product includes a number of rows and columns of the first product. In some disclosed examples, the modification is a change to at least one of the name of the first product, the view or position of the first product, the layout of the first product, the indication of whether the first product is in stock, the indication of whether the first product is on a pallet or the price of the first product.

Some disclosed example methods further include displaying, via the first preview window, a first group of candidate reference products identified by the automatic image recognition application as potential matches to the first product. In some disclosed examples, the modification is based on a user selection of a first one of the first group of candidate reference products. In some such disclosed examples, updating the first product record includes assigning the first one of the first group of candidate reference products as matching the first product. In some disclosed examples, the segmentation further includes a second frame overlaying the image and defining a second location of a second product identified by the automatic image recognition process. Some such disclosed example methods also include displaying, in response to a user selection of the second frame, a second preview window simultaneously with the second frame. The second preview window includes second product information associated with the second product. Some such disclosed example methods further include displaying, via the second preview window, a second group of candidate reference products identified by the automatic image recognition application as potential matches to the second product.

These and other example methods, apparatus, systems and articles of manufacture (e.g., physical storage media) to implement product auditing in point-of-sale images are disclosed in further detail herein.

FIG. 1 illustrates an example auditing system 100 to perform image recognition and point-of-sale image auditing in accordance with the teachings of this disclosure. The example auditing system 100 may be implemented by an MRE. For example, the auditing system 100 may be used in a workflow of an auditor to perform product auditing in a point-of-sale image. In the illustrated example, an example image capturing device 102 (e.g., a camera, a video recorder, a smartphone, a tablet, etc.) captures an example image 104 (e.g., point-of-sale image) of an example shelf 106 or section of the shelf 106 having one or more products 108a-108n (e.g., consumer packaged goods, items, objects, etc.). The example shelf 106 may be from a merchant (e.g., a retailer, a wholesaler, a club store, etc.). In some examples, the shelf 106 may be in another location, such as a consumer's home, in a vending machine, at a kiosk, etc. In the illustrated example, the captured image 104 is sent to the auditing system 100 through an example network 110 (e.g., the Internet, a local area network, a wide area network, a cellular data network, etc.) via a wired and/or wireless connection (e.g., a cable/DSL/satellite modem, a cell tower, etc.).

In the illustrated example of FIG. 1, the auditing system 100 processes the captured image 104 to identify the product(s) 108a-108n (and/or information associated with the product(s) 108a-108n) in the captured image 104 and, thus, perform an audit of the shelf 106 or section of the shelf 106. In the illustrated example, the auditing system 100 includes an example automatic image recognition application 112 that analyzes the captured image 104 in attempt to identify the product(s) 108a-108n in the captured image 104. The automatic image recognition application may be implemented by an application, software, engine, algorithm, hardware, etc. or any combination thereof. The automatic image recognition application 112 compares the captured image 104 to reference product images (e.g., records) stored in a product database 114 to attempts to match the product(s) 108a-108n in the capture image 104 to catalogued (e.g., known) products. The reference product images are images of known products. In some examples, the reference product images are provided by an external source 116 (e.g., a manufacturer, a reference image collection team, the Internet, etc.). Example techniques that may be used to implement the automatic image recognition application 112 include, but are not limited to, examples described in: U.S. patent application Ser. No. 14/530,129, entitled "Context-Based Image Recognition For Consumer Market Research," and filed Oct. 31, 2014, which corresponds to U.S. Patent Publication No. 2016-0125265, which published on May 5, 2016; U.S. Pat. No. 8,908,903, entitled "Image Recognition to Support Shelf Auditing for Consumer Research," and granted on Dec. 9, 2014; and U.S. Pat. No. 8,917,902entitled "Image Overlaying and Comparison for Inventory Display Auditing," and granted on Dec. 23, 2014, all of which are incorporated herein by reference in their entireties.

In the illustrated example, the example auditing system 100 includes an image segmentor 118, which segments the captured image 104 analyzed by the automatic image recognition application 112. In particular, the image segmentor 118 generates a frame (e.g., a rectangle, a grid, a square, an object, etc.) around the one or more products recognized/identified in the captured image 104 by the automatic image recognition application 112. In some examples, the example image segmentor 118 separates the captured image 104 into one or more images (e.g., sub-images) that each depict a respective one of the product(s) 108a-108n. In some examples, the captured image is segmented, via the image segmentor 118 first, and then the segmented image is analyzed by the automatic image recognition application 112 in attempts to match the segments to the reference image records in the product database 114. In some examples, the image segmentor 118 performs segmentation by using a pattern recognition algorithm to compare particular product reference product images (e.g., selected based on stockkeeping units (SKUs) and/or other product identification stored in the product records in the product record database 114) with the captured image 104 to identify the boundaries of the products 108a-108n. Additionally or alternatively, the captured image 104 may be segmented through user input, as disclosed in further detail herein. Although illustrated as separate, in some examples the image segmentor 118 is implemented as part of the automatic image recognition application 112. For example, the image analysis and segmentation process may occur simultaneously via the same application or program. In the illustrated example, the automatic image recognition application 112 and image segmentor 118 may be located within the example auditing system 100. However, in other examples the automatic image recognition application 112 and/or the image segmentor 118 may be located offsite, and the results of which may then communicated to the auditing system 100. For example, the automatic image recognition application 112 and/or the image segmentor 118 may be supplied by a third party.

As disclosed herein, the example automatic image recognition application 112 and/or the image segmentor 118 attempt to recognize/identify and match the product(s) 108a-108n in the captured image 104 with the reference image records stored in the product database 114. Example reference image records include, for example, reference images representing respective reference products, information describing the respective reference products, etc. Further example records are disclosed in U.S. patent application Ser. No. 14/530,129, entitled "Context-Based Image Recognition For Consumer Market Research," and filed Oct. 31, 2014, which corresponds to U.S. Patent Publication No.

2016-0125265, which published on May 5, 2016; and which is incorporated herein by reference in its entirety.

The automatic image recognition application 112 and/or the image segmentor 118 create or generate a segmented image (e.g., such as the segmented image 200 of FIG. 2, discussed in further detail herein) that may be stored in a match database 120 and which may be viewed on an example user interface 122. The user interface 122 may be implemented by any type of imaging display using any type of display technology, such as a liquid crystal display (LCD), a light emitting diode (LED) display, a plasma display, a cathode ray tube (CRT) display, etc., one or more input devices (e.g., a touchscreen, touchpad, keypad, mouse, keyboard, etc.) and/or one or more of the output devices included in the example processing system 900 of FIG. 9, which is described in greater detail below. Once the automatic image recognition application 112 and/or the image segmentor 118 generates the segmented image, the segmented image may be displayed on the user interface 122 for an auditor to review.

Figure 2A:
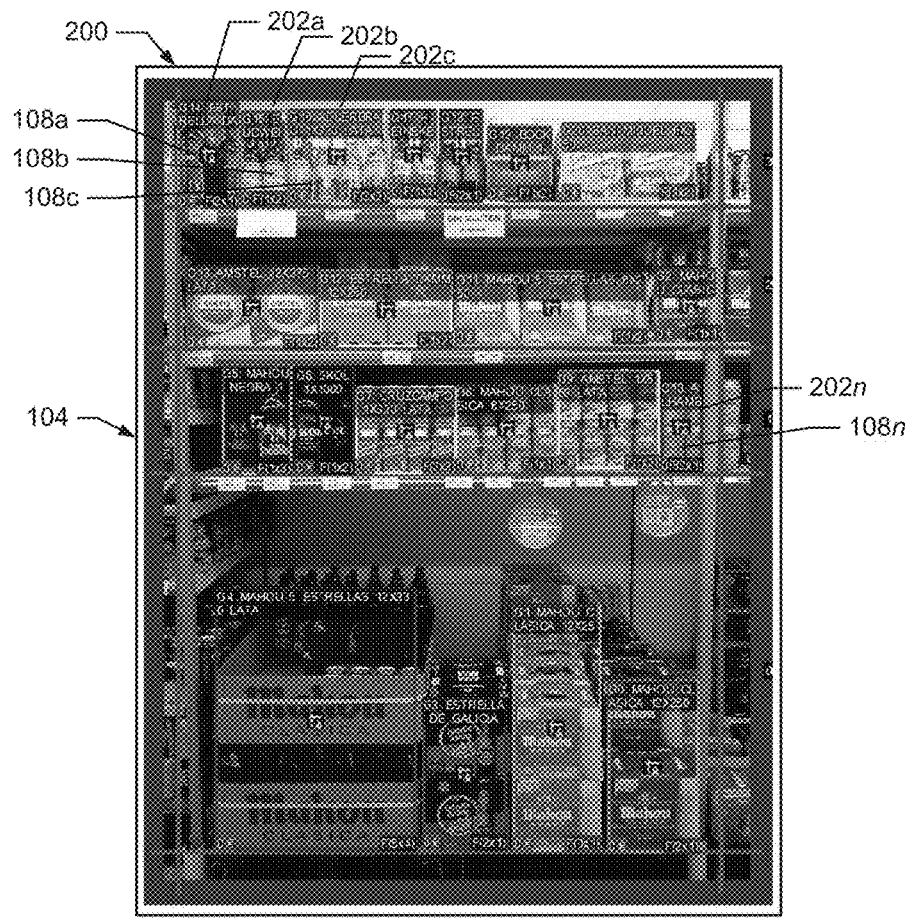
FIG. 2A illustrates an example segmented image generated by an example automatic image recognition application of the example auditing system of FIG. 1.

FIG. 2A illustrates an example segmented image 200 corresponding to the captured image 104 produced by the automatic image recognition application 112 and/or the image segmentor 118. The segmented image 200 may also be referred to as a segmentation 200. The segmented image 200 includes one or more frames 202a-202n (e.g., an object, a boundary, a rectangle, a grid, etc.) overlaid on top of the captured image 104. The frames 202a-202n indicate the locations (e.g., positions, boundaries) of the products 108a-108n in the captured image 104 that have been detected and identified by the automatic image recognition application 112 and/or the image segmentor 118. In the illustrated example, the frames 202a-202n include identifying information (e.g., a name of the respective products 108a-108n) along a top of the frames 202a-202n. The identifying information included in respective ones of the frames 202a-202n is associated with the reference product(s) determined to match the corresponding products 108a-108n depicted in the frames 202a-202n and is stored in the match database 120. In particular, if a match is found for one of the products 108a-108n, the automatic image recognition application 112 and/or the image segmentor 118 stores a match record in the match database 120 for the specific product 108a-108n. In some examples, the match record includes the captured image 104, metadata associated with the captured image (if present), and/or a product identifier as returned from the reference record associated with the matching reference image (e.g., an MRE assigned product number, a UPC, etc.). Each of the match records is associated with a particular one of the frames 202a-202n.

In some examples, as illustrated in FIG. 1, the information included in the match record(s) is used by an example report generator 124 to generate an example match report 126. In some examples, the match record(s) are stored in the match database 120 and/or included in the match report 126 and/or are used by the example auditing system 100 to generate shelf-audit reports.

However, as mentioned above, in some automatic image recognition applications, the created segmented images, while effective in most situations, are reviewed by an auditor (e.g., a user, an operator, etc.) to verify the accuracy of the results (i.e., the products identified as matching the frames 202a-202n). In some instances, the automatic image recognition application 112 and/or the image segmentor 118 does not detect the location of a product and/or cannot find a match for the segmented product. As such, auditors may spend numerous hours reviewing the results of the automatic image recognition process and attempting to manually identify the product(s) shown in the captured image 104. In particular, this process may be separated into two tasks: (1) identifying one or more regions of interest (ROIs), which are areas where products that still need to be segmented appear, and (2) labeling the products in the ROI(s). Labeling the products may involve manually searching through a database containing thousands of products and then assigning an item number, such as an SKU, and/or International Article Number (EAN) code to the product depicted in an ROI once a reference product is located. This process of manually reviewing thousands of products in a database and assigning SKU/EAN codes may require substantial time and experience on behalf of the auditor.

Figure 2B:
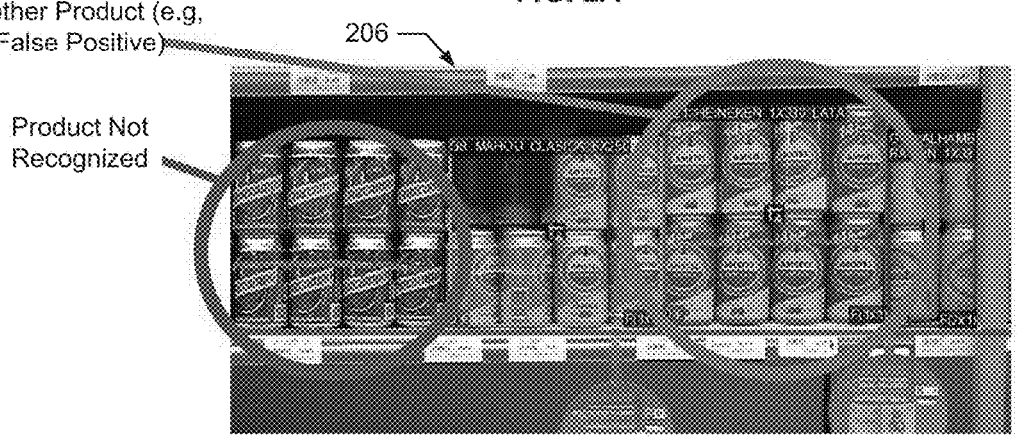
FIG. 2B illustrates an example of the segmented image of FIG. 2A in which products were not recognized and/or products are mislabeled by the example automatic image recognition application.

For example, FIG. 2B illustrates an example portion 206 of the segmented image 200. In the illustrated example of FIG. 2B, the cans on the left side of the portion 206 were not detected by the automatic image recognition application 112 and/or the image segmentor 118. As a result, the cans on the left side of the portion 206 were not were not segmented or framed and, thus, were not matched with any products. This may occur for a number of reasons such as, but not limited to, improperly facing products, lighting, obstructions, etc. Additionally, in some instances, the automatic image recognition application 112 may incorrectly label a product. For example, as shown FIG. 2B, the Amstel® cans on the right have been incorrectly labeled as Heineken®. Again, this may occur of a number of reasons, including improperly facing products, lighting, obstructions, etc.

Figure 2C:
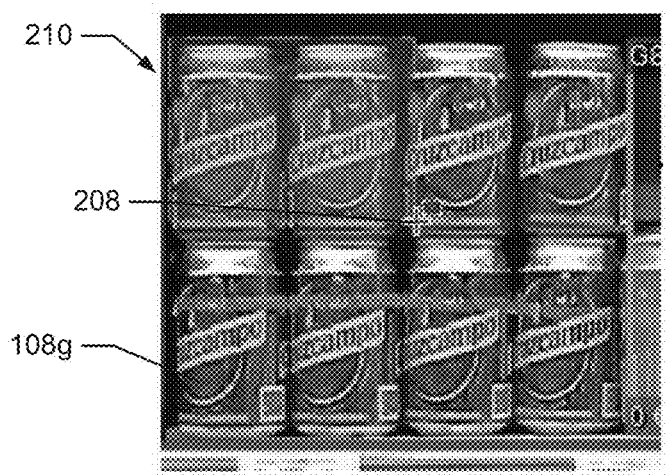
FIGS. 2C and 2D illustrate an example operation to identify an example region of interest in the segmented image of FIG. 2B.
Figure 2D:
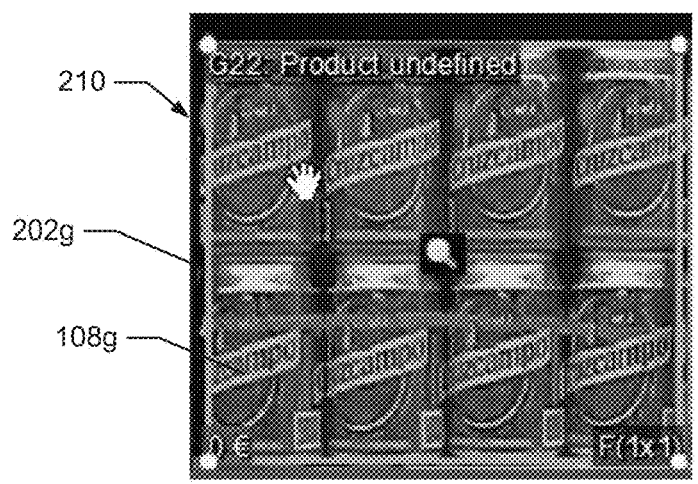

The example auditing system 100 of FIG. 1 enables an auditor to identify an ROI in the captured image 104, and then performs a confidence search to return one or more candidate products that may be in the ROI identified by the auditor. The candidate products are assigned respective confidence levels that indicate degrees of certainty or likelihoods that the respective candidate products are the same as the product in the ROI. To identify an ROI, for example, an auditor may highlight (e.g., using a mouse or other input device) an area on the segmented image 200. For example, FIGS. 2C and 2D illustrate an auditor using an example cursor 208 to highlight an ROI 210 containing the product 108g. In the illustrated example, the ROI 210 is an area in the segmented image 200 showing the product 108g, which, in the illustrated example, was not segmented or identified by the example automatic image recognition application 112 and/or the example image segmentor 118. Once the ROI 210 is highlighted, an example frame 202g (e.g., a boundary, a grid, a rectangle, a square, an object, etc.) is generated around the ROI 210 (e.g., which corresponds to the cans on the left in FIG. 2B that were not segmented), as illustrated in FIG. 2D.

To detect or identify the product(s) 108g depicted in the ROI 210 identified by the auditor (e.g., based on user input), the example auditing system 100 of FIG. 1 includes an example ROI detector 128, which detects the ROI 210 (e.g., a sub-image) of the captured image 104. Once the auditor defines the ROI 210 and the ROI detector 128 detects the ROI 210, an example candidate product searcher 130, included in the example auditing system 100 of FIG. 1, automatically analyzes the ROI 210 to identify one or more candidate products that may potentially match the product 108g in the ROI 210. The candidate product searcher 130 compares the ROI 210 to one or more reference product records stored in the product database 114. In some examples, this process occurs while the auditor continues to define other ROIs in the captured image 104. For example, the captured image 104 may contain multiple areas where products were not detected by the automatic image recognition application 112 and/or the image segmentor 118 and, thus, were not segmented. The auditor may create frames (e.g., similar to the frame 202g) around each of the ROIs. In some examples, while the auditor is creating the frames, the example auditing system 100 processes the identified ROI(s) for prior identified frames to identify one or more candidate products, as disclosed in further detail herein.

Figure 2E:
FIG. 2E illustrates an example frame generated around the region of interest identified in FIGS. 2C and 2D and produced by the example auditing system of FIG. 1.
Figure 5:
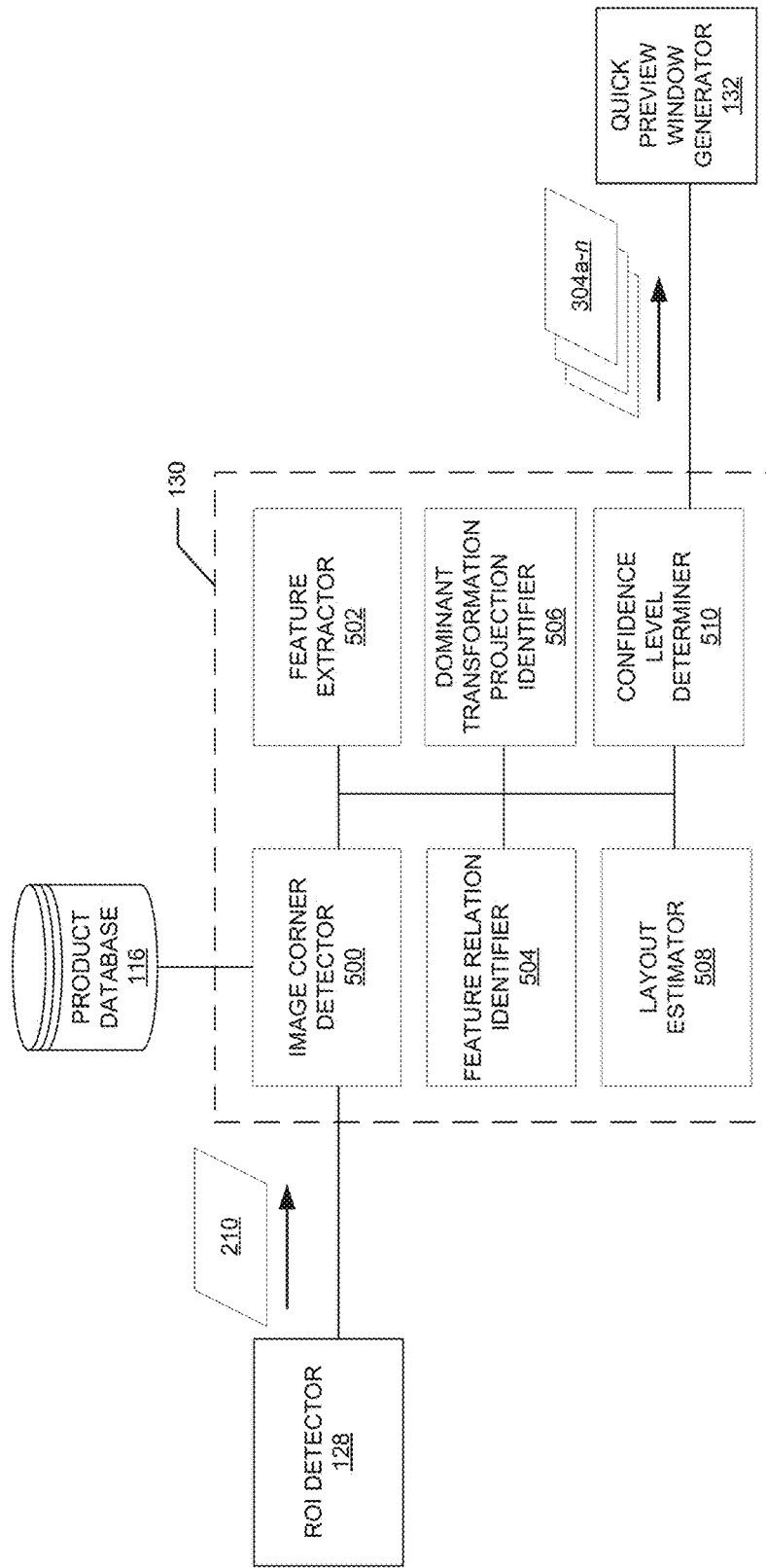
FIG. 5 illustrates an example implementation of an example candidate product searcher of the example auditing system of FIG. 1 that may be used to identifying the candidate products displayed in the example quick preview window of FIG. 3.

For example, when the example candidate product searcher 130 begins analyzing the ROI 210, the example frame 202g may indicate the product is undefined, as depicted in the example of FIG. 2D. In some examples, an icon (e.g., a magnifying glass, an hourglass, etc.) is shown over the ROI 210 to indicate the candidate product searcher 130 is searching for candidate products. An example implementation of the candidate product searcher 130 is illustrated in FIG. 5, which is described in further detail herein. Once the search is complete, a product name (e.g., "Cruzcampo") and an estimation of the layout (indicated by the number of rows and columns) may be displayed in the frame 202g over the ROI 210, as illustrated in the example of FIG. 2E. In some examples, the name of the product corresponds to the candidate product with the highest confidence level, as disclosed in further detail herein.

Figure 3:
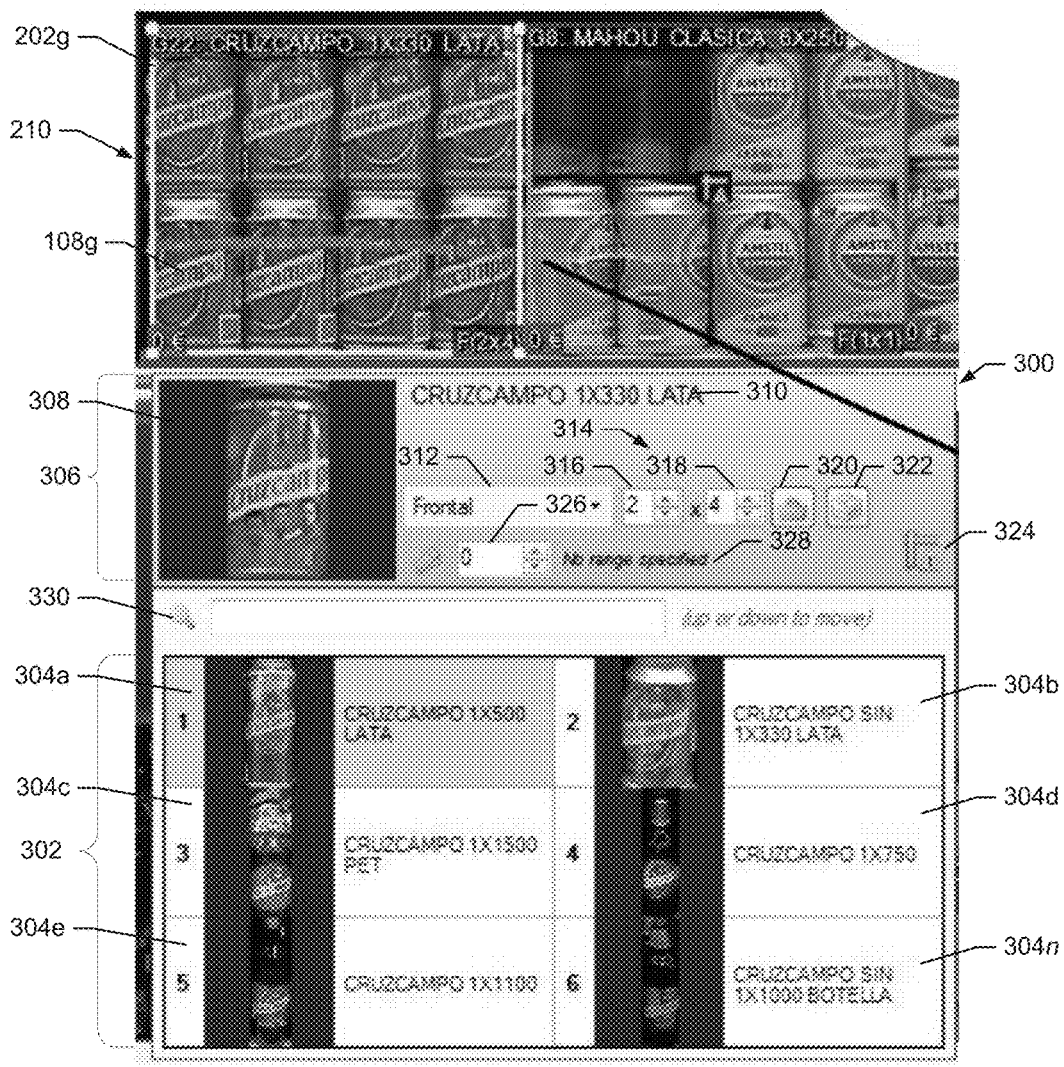
FIG. 3 illustrates an example quick preview window displaying example candidate products that may correspond to a product in the region of interest identified in FIGS. 2C and 2D.

To review the candidate products and assist an auditor in verifying and/or correcting the product matched with the product in the ROI 210, the example auditing system 100 of FIG. 1 includes an example quick preview window generator 132 (e.g., a preview window generator) that generates an example quick preview window 300 (e.g., a preview window), as shown in FIG. 3. The quick preview window 300 may be implemented as any graphical user interface, window, panel, etc. displayable on the user interface 122. In some examples, the quick preview window 300 is displayed, via the user interface 122, simultaneously with the ROI 210. For example, the quick preview window 300 may be displayed over a section or portion of the segmented image 200 adjacent (e.g., near) the ROI 210. In other examples, the quick preview window 300 may be displayed adjacent the segmented image 200 (e.g., next to the segmented image 200 on the user interface 122).

In the illustrated example, the quick preview window 300 includes a candidate section 302 that has a list of one or more candidate products 304a-304n identified by the candidate product searcher 130 as potential candidates for the product 108g. In some examples, the candidate products 304a-304n are assigned respective confidence levels (e.g., a score, a value). In the illustrated example, the candidate products 304a-304n are listed in order of their respective confidence levels (e.g., from highest to lowest). In some examples, the confidence levels are displayed adjacent the respective candidate products 304a-304n (e.g., "90%" may be displayed next to the candidate product 304a). The confidence levels represent degrees of certainty or likelihoods that the respective candidate products 304a-304n match the product 108g. In some examples, the quick preview window 300 is automatically displayed (e.g., opened, presented, etc.) on the user interface 122 once the candidate product searcher 130 is finished searching the records in the product database 114. In other examples, the quick preview window 300 may be displayed based on user input such as, for example, when the user selects the frame 202g. For example, after creating the frame 202g, the auditor may continue to identify other ROIs in the captured image 104. While the auditor is creating the other frames, the candidate product searcher 130 performs the confidence search and obtains the candidate products 304a-304n for the frame 202g. Then, when the auditor desires, the auditor may select (e.g., by clicking) a previously created frame (e.g., the frame 202g) to open the quick preview window 300 for the respective ROI (e.g., the region of the image associated with or bounded by the frame).

In some examples, the candidate product having the highest confidence level is automatically assigned by the candidate product searcher 130 to the product 108g in the ROI 210. In some examples, the candidate product searcher 130 creates and/or updates a record (e.g., in the match database 120) of the frame 202g and/or the product 108g to indicate the product 108g is matched to the candidate product. In the illustrated example of FIG. 3, the quick preview window generator 132 also generates the example quick preview window 300 such that each of the candidate products 304a-304n includes a respective reference image (e.g., a thumbnail) of the respective reference product and the name of the respective reference product. In the illustrated example, a first candidate product 304a is highlighted, indicating the first candidate product 304a is currently assigned or matched to the product 108g in the ROI 210 (e.g., by the candidate product searcher 130). If the first candidate product 304a is incorrect, the auditor may select (e.g., by clicking) another one of the candidate products 304b-304n in the candidate section 302 to assign the respective candidate product 304b-304n to the product 108g in the ROI 210.

In the illustrated example, the product information related to the currently assigned product is displayed in a product information section 306 of the quick preview window 300. The product information section 306 includes product information assigned (e.g., stored as a match record in the match database 120) to the product 108g in the ROI 210. For example, the product information section 306 may include a reference product image 308 (e.g., a thumbnail) corresponding to the respective reference product determined to match the product 108g, a type or name 310 of the matching reference product, a view 312 indicating the view or orientation (e.g., frontal, side, top, etc.) of the product 108g (e.g., relative to the matching reference product's image), facings information 314 indicating a number of facings of the product identified in the ROI 210 and the corresponding layout in number of rows 316 and columns 318 of the facings that appear in the ROI 210, stock information 320 (e.g., which may be a button, an indicator, an icon, a flag, etc.) to indicate whether the product is out of stock or not (e.g., based on information associated with the matching reference product in the product database 114), pallet information 322 indicating if the product is on a pallet or not (e.g., based on information associated with the matching reference product in the product database 114), metric information 324 (e.g., based on information associated with the matching reference product in the product database 114), price information 326 and a range 328 of the price (e.g., based on information associated with the matching reference product in the product database 114), etc. In other examples, the product information section may display more or less product information.

The example quick preview window 300 enables an auditor to quickly and easily determine and/or modify the information assigned (e.g., stored as a record in the match database 120) to the product 108g of the ROI 210. If the information is changed, the quick preview window generator 132 updates the record for the respective frame (e.g., the frame 202g) or product (e.g., the product 108g) based on the modification. For example, if the auditor views the candidate section 302 and determines a second product 304b is the correct product, the auditor may select the second product 304b in the quick preview window 300 to assign the second candidate product 304b to the product of the ROI 210. In another example, the auditor can set or change the view 312 of the product in the ROI 210. In another example, the auditor can establish if the product 108g is out of stock. For example, the auditor may compare a position of the product 108g in the shelf 106 in the image 104 with the same or similar position in the same shelf 106 from a previous image, if available. If the product is not the same, the auditor can establish (e.g., by clicking or selecting a flag or button) the product is out of stock.

In some examples, the metric information 324 is provided to notify the auditor of any potential errors in the product information. For example, the auditing system 100 may compare the view 312 option chosen by the auditor against a probability that the product 108g belongs to the specific view. In some examples, the probability is obtained by processing data previously obtained (e.g., from other point-of-sale image audits). If the auditing system 100 determines the view 312 option chosen by the auditor is not probable, the metric information 324 may include an indication (e.g., an instruction, a warning, etc.) that such a view is not probable. In another example, the auditing system 100 may determine if there are any potential errors in the number of the rows 316 and the columns 318 based on the view 310, the number of facings 314, the recognized product, and/or the pixel to millimeter (pixel/mm) ratio of the image of the product 108g. If the auditing system 100 identifies a potential error in the number of the rows 316 and the columns 318, the metric information 324 may include an indication (e.g., an instruction, a warning, etc.) that such numbers are potentially incorrect.

Additionally or alternatively, in some examples, the auditing system 100 may determine if there any potential errors in the pallet information 322 by comparing the option as chosen by the auditor against a probability that the product 108g belongs to a pallet. In some examples, the probability is obtained by processing data previously obtained (e.g., from other point-of-sale image audits). If the auditing system 100 determines the pallet information 322 is potentially incorrect, the metric information 324 may include an indication (e.g., an instruction, a warning, etc.) that such a selection is potentially incorrect.

Additionally or alternatively, in some examples, the auditing system 100 may compare the price 326 chosen by the auditor against previous prices of the same product (e.g., in the same store). If the auditing system 100 determines the price 326 is potentially incorrect, the metric information 324 may include an indication (e.g., an instruction, a warning, etc.) that such a price is not probable.

In the illustrated example of FIG. 3, the quick preview window 300 includes a search bar 330. An auditor may type a word (e.g., a product type, a name of a product, a brand, etc.) into the search bar 330 to retrieve or obtain additional reference products from the product database 114. The retrieved product may be displayed in the candidate section 302, for example.

Figure 4:
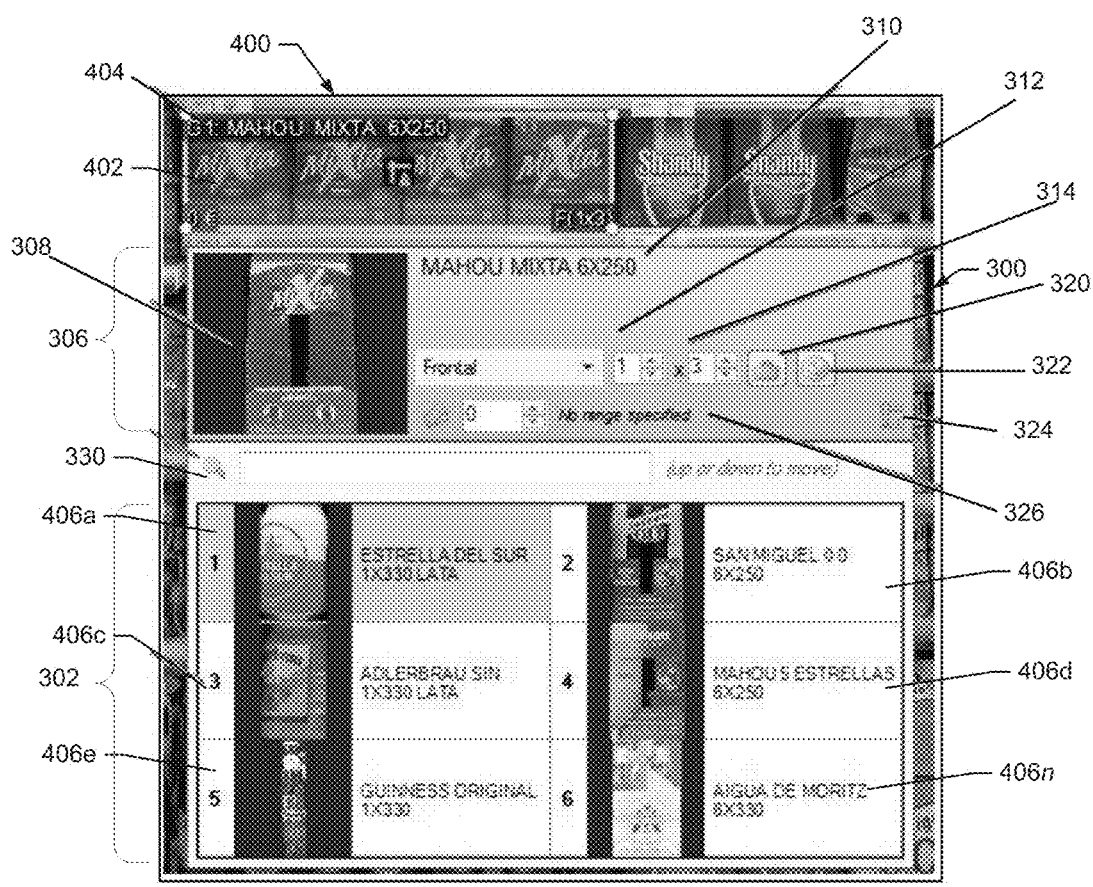
FIG. 4 illustrates another example quick preview window for displaying product information related to a product identified in a frame of a segmentation and generated by the example auditing system of FIG. 1.

In some examples, the quick preview window generator 132 may generate or create the quick preview window 300 for one or more of the products 108a-108n already identified by the automatic image recognition application 112 and/or the image segmentor 108 (without including ROI detection, candidate product searching, etc.). As such, the product information related to the recognized product may be displayed via the user interface 122. For example, FIG. 4 illustrates an example segmented image 400 showing a product 402 detected during the automatic image recognition process. The example segmented image 400 includes a frame 404 having a name (e.g., "Mahou") of the recognized product disposed over the product 402. The auditor may select (e.g., by clicking) on the frame 404 to view the product information related to the product 402. Once the auditor selects the frame 404, the quick preview window 300 is displayed adjacent the frame 404 (e.g., adjacent the product 402). Similar to above, an auditor may set and/or modify the product information in the product information section 306 of the quick preview window 300. In the illustrated example, the product information includes the reference image 308 of the recognized product, the name 310 of the recognized product, the view 312, the facings information 314, the stock information 320, the pallet information 322, the metric information 324 and the price information 326 (e.g., which may include a range of the price). In other examples, more or less product information may be displayed.

In some examples, when the frame 404 is selected by the auditor, the candidate product searcher 130 operates, as disclosed herein, to identify one or more candidate products 406a-406n potentially corresponding to the product 402 depicted in the frame 404. In some such examples, the candidate product(s) 406a-406n are displayed in the quick preview window 300 from which the auditor may select to change the reference product assigned (e.g., matched) to the product 402. In the illustrated example, the candidate products 406a-406n are listed in the candidate section 302 of the quick preview window 300. In some examples, the candidate products 406a-406n are obtained via a confidence search performed by the example candidate product searcher 130 of FIG. 1, as noted above. However, in other examples, the candidate products 406a-406n may be based on reference products identified during the automatic image recognition process (e.g., performed by the automatic image recognition application 112) as potentially matching the product 402. In some examples, the candidate products 406a-406n are obtained using a string comparison algorithm. In some examples, the candidate products 406a-406n are assigned respective confidence levels and the candidate products 406a-406n may be sorted by the confidence levels. If an auditor desires to change the product recognized in the frame 404, the auditor may select one of the candidate products 406a-406n, which then updates the product information in the product information section 306. In the illustrated example, the quick preview window 300 includes the search bar 330, which enables an auditor to further search for products in the product database 114.

An example implementation of the candidate product searcher 130 included in the example auditing system 100 of FIG. 1 is illustrated in FIG. 5. In the illustrated example, the candidate product searcher 130 includes an example image corner detector 500, an example feature extractor 502, an example feature relation identifier 504, an example dominant transformation projection identifier 506, an example layout estimator 508 and an example confidence level determiner 510.

Once the ROI 210 is identified or detected by the ROI detector 128, the image corner detector 500 detects the corners of the ROI 210 from the pixels in the ROI 210. The corners of an image, for example, may contain meaningful pixels that can be used to identify the product contained in the ROI 210. For example, the corner detector 500 may determine whether a pixel is a corner or not based on comparing information (e.g., location, color, etc.) for pixels in a neighborhood to identify characteristics consistent with a corner (e.g., two intersecting edges terminating at a given location). In some examples, the image corner detector 500 uses an optimal accelerated segment test (OAST) to detect the corners of the ROI image 210. A description the OAST is found in Elmar Mair et al., "Adaptive and Generic Corner Detection Based on the Accelerated Segment Test," *Proceedings of the European Conference on Computer Vision* (ECCV'10), September 2010, hereby incorporated by reference in its entirety. However, in other examples, other image corner detection techniques may be employed.

In the illustrated example, the feature extractor 502 identifies and/or describes features (e.g., key points or characteristics of an image containing relevant information). In some examples, the features are associated with the corners of the ROI 210 detected by the image corner detector 500. In some examples, the features are identified using the OAST disclosed above, and the feature extractor 502 describes the features using windows of pixels. For example, the features may include 5×5 windows of normalized raw pixel values in grayscale (e.g., by taking the values of the pixels and subtracting the mean and dividing by the standard deviation (SD), yielding a normal distribution (mean 0, SD 1) for the normalized pixels). In other examples, other size windows may be used. The example image corner detector 500 and the example feature extractor 502 are to perform the same functions on reference product image(s) depicting reference product(s) stored in the product database 114, for example, to extract (e.g., identify, determine) and describe features and/or corners of the reference product image(s).

In the illustrated example, the example feature relation identifier 504 compares the features extracted from the ROI 210 with the features extracted from a reference product image corresponding to a reference record selected from the product database 114 to determine or identify any features that are similar (e.g., match, form a relationship, etc.). The example feature relation identifier 504 identifies relationships (e.g., relations), among features of the ROI 214 and of the reference image that are similar. In some examples, however, there may be a relatively large amount of features extracted from the ROI 210 and/or the reference image. As a result, this relation identification process may take significant time (e.g., when comparing 5000 features of one image to 30,000 features of another image). In some examples, one or more relationships among one group of features may not be compatible with the relationships among other groups of features. For example, the relationships between similar features among the ROI 210 and the reference image may be vectors defining the relative difference in location of the features in the different images. In such an example, two features having a relationship characterized by a large angle would not be compatible without a group of relationships for a group of feature pairs each having relatively small angles. To decrease processing time needed to compare the ROI 210 and the reference image, in some examples a metric is applied that determines whether the relationship is compatible or not. In other words, the metric can be applied to discriminate which relationships have a high grade of correlation (e.g. a high degree of similarity). For example, the relationships can be assigned grades of correlation (e.g., a score or value of similarity), which can be compared to a threshold to determine if the relationship is compatible or not. In some examples, the metric is the Pearson product-moment correlation coefficient (PPMCC or PCC).

Once matching features are found and/or the relationships are identified, the example dominant transformation projection identifier 506 identifies a dominant transformation projection (e.g., a mathematical formula or function) that transforms the features from one of the images (e.g., the ROI 210) to the other image (e.g., the reference image) and which can translate a point from the ROT image 214 to the reference image, or vice versa. In some examples, a random sample consensus (RANSAC) algorithm is used. In some examples, the dominant transformation projection represents the most important or influential match or relationship between the features of the ROI 210 and the reference image. In some examples, the dominant transformation projection identifier 506 identifies the area (e.g., a rectangle) of the product, from which the position of the product (e.g., front facing, side facing, top facing, etc.) is estimated.

In some examples, the example dominant transformation projection identifier 506 produces a scale of the reference image. Using this scale, the example layout estimator 508 determines the layout of the product in the ROI 210, which may include the number of rows and columns of the product in the ROI 210. For example, as illustrated in FIG. 3, the number of rows of the product is 2 and the number of columns is 4.

The example confidence level determiner 510 calculates a confidence level (e.g., a value, a score) based on the number of inliers, which is the number of features that are compatible with the dominant transformation projection (e.g., that lie within an area of the product), as determined by the dominant transformation projection identifier 506. In some examples, the more inliers that are identified the higher the confidence level. The example candidate product searcher 130 may repeat this process for any number of reference images (e.g., patterns) stored in the product database 114. After processing the reference images (e.g., comparing the features extract from the ROI 210 to features extracted from the reference images), the example candidate product searcher 130 sorts the candidate products (associated with the respective reference images) based on the confidence levels, which may then be presented to the auditor via the example quick preview window 300 (FIG. 3). In some examples, the confidence levels of the reference images are compared to a threshold, and only candidate products having reference images that satisfy the threshold are displayed by the example quick preview window 300.

While example manners of implementing the auditing system 100 are illustrated in FIGS. 1-5, one or more of the elements, processes and/or devices illustrated in FIGS. 1-5 may be combined, divided, re-arranged, omitted, eliminated and/or implemented in any other way. Further, the example automatic image recognition application 112, the example image segmentor 118, the example report generator 124, the example ROI detector 128, the example candidate product searcher 130, the example quick preview window generator 132, the example image corner detector 500, the example feature extractor 502, the example feature relation identifier 504, the example dominant transformation projection identifier 506, the example layout estimator 508, the example confidence level determiner 510 and/or, more generally, the example auditing system 100 of FIGS. 1-5 may be implemented by hardware, software, firmware and/or any combination of hardware, software and/or firmware. Thus, for example, any of the example automatic image recognition application 112, the example image segmentor 118, the example report generator 124, the example ROI detector 128, the example candidate product searcher 130, the example quick preview window generator 132, the example image corner detector 500, the example feature extractor 502, the example feature relation identifier 504, the example dominant transformation projection identifier 506, the example layout estimator 508, the example confidence level determiner 510 and/or, more generally, the example auditing system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, automatic image recognition application 112, the example image segmentor 118, the example report generator 124, the example ROI detector 128, the example candidate product searcher 130, the example quick preview window generator 132, the example image corner detector 500, the example feature extractor 502, the example feature relation identifier 504, the example dominant transformation projection identifier 506, the example layout estimator 508, and/or the example confidence level determiner 510 is/are hereby expressly defined to include a tangible computer readable storage device or storage disk such as a memory, a digital versatile disk (DVD), a compact disk (CD), a Blu-ray disk, etc. storing the software and/or firmware. Further still, the example auditing system 100 may include one or more elements, processes and/or devices in addition to, or instead of, those illustrated in FIGS. 1-5, and/or may include more than one of any or all of the illustrated elements, processes and devices.

Figure 6:
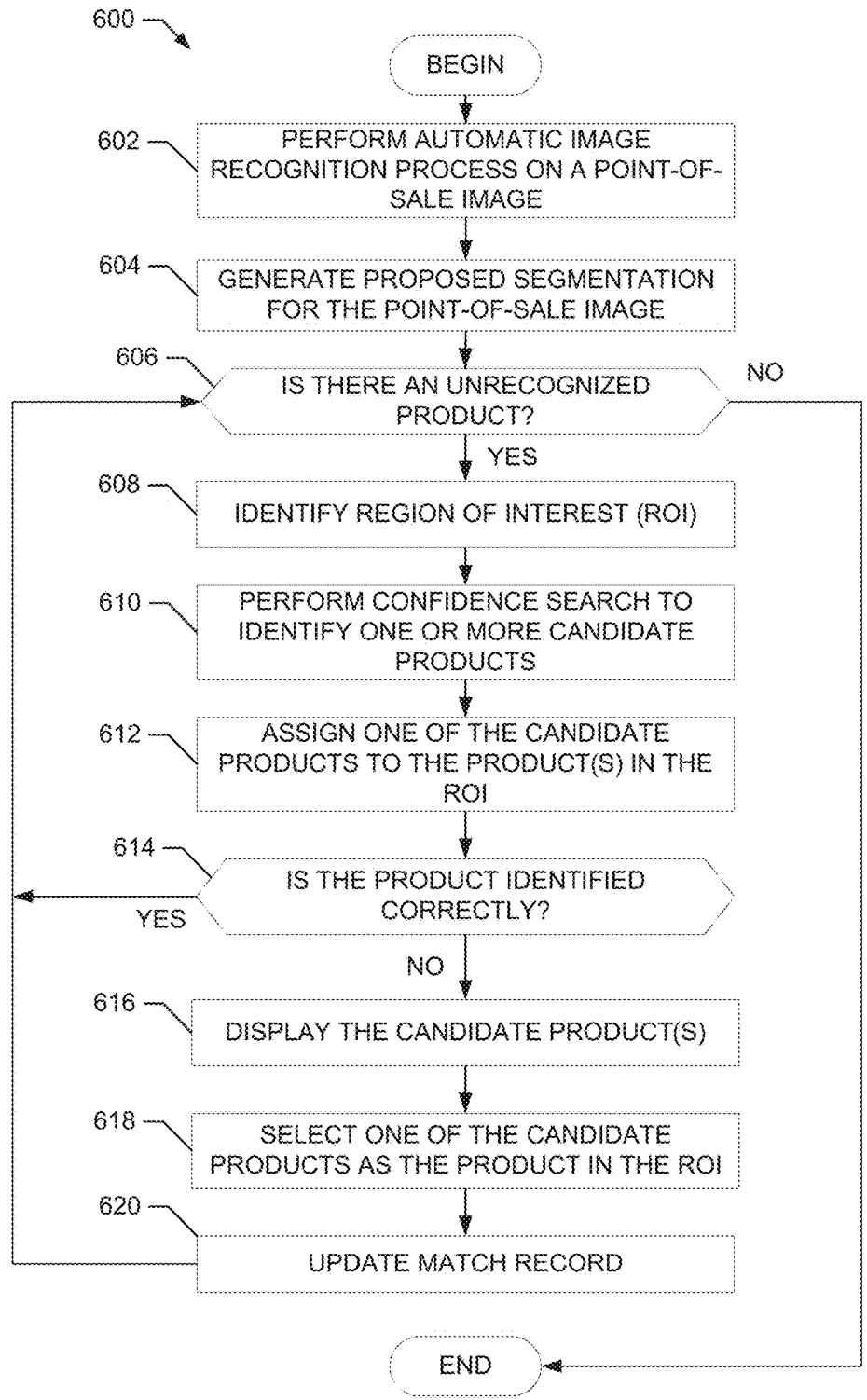
FIG. 6 is a flowchart representative of an example method, at least partially executable by machine readable instructions, which may be implemented by the example auditing system of FIG. 1.
Figure 7:
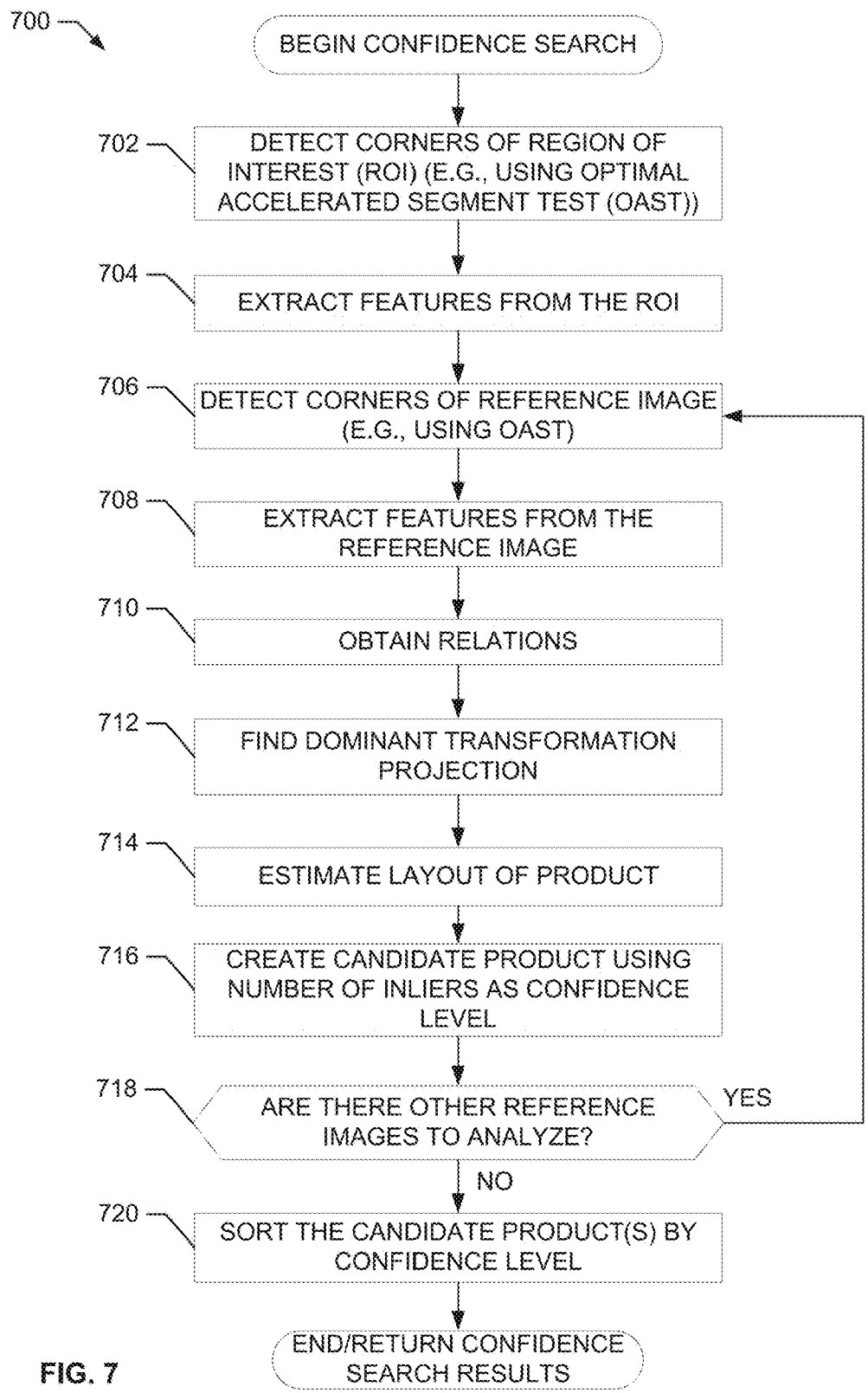
FIG. 7 is a flowchart representative of an example method, at least partially executable by machine readable instructions, to perform an example confidence search, which may be implemented by the example candidate product searcher of FIG. 5.
Figure 8:
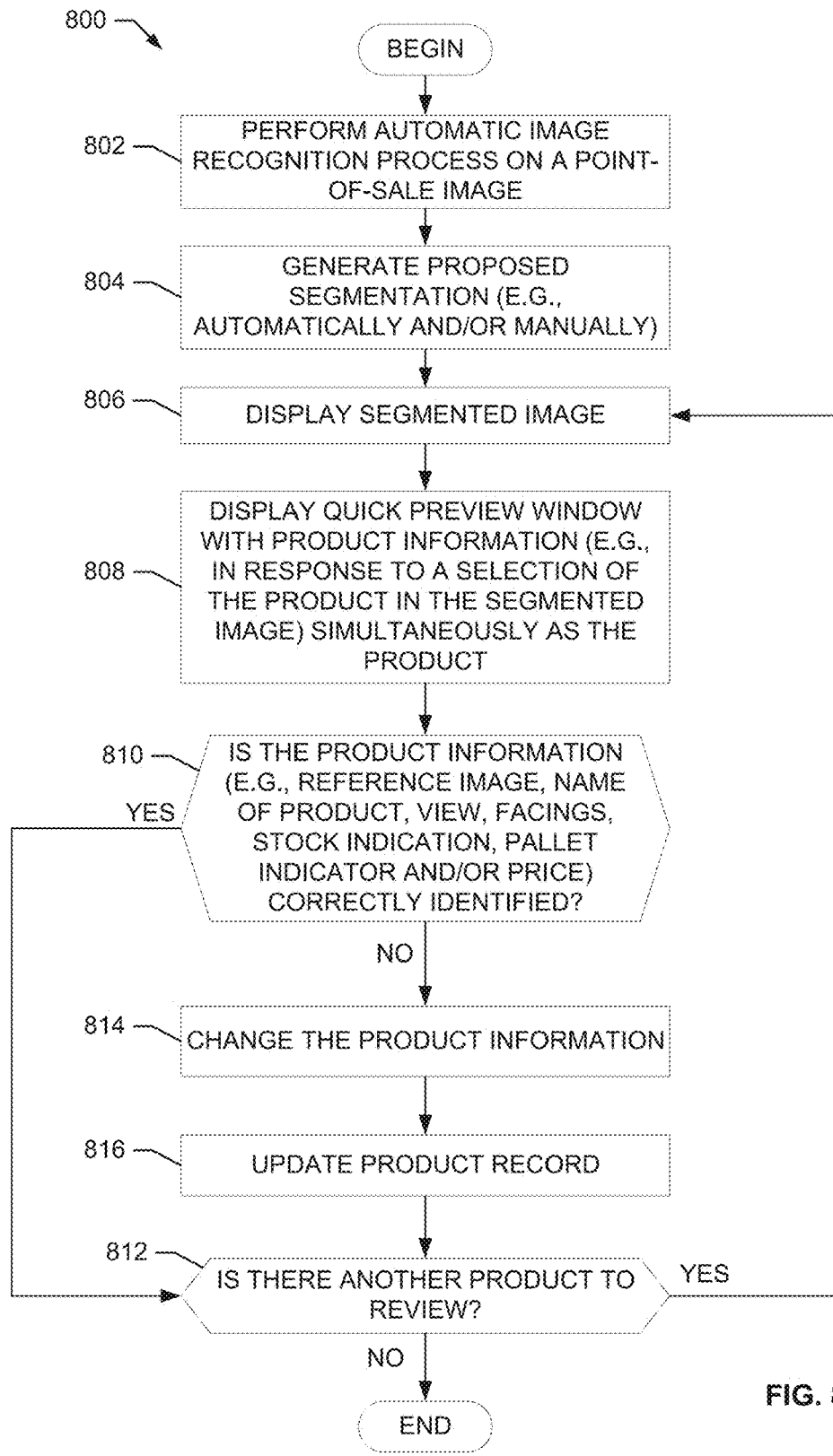
FIG. 8 is a flowchart representative of an example method, at least partially executable by machine readable instructions, which may be implemented by the example auditing system of FIG. 1.

Flowcharts representative of example machine readable instructions for implementing the example automatic image recognition application 112, the example image segmentor 118, the example report generator 124, the example ROI detector 128, the example candidate product searcher 130, the example quick preview window generator 132, the example image corner detector 500, the example feature extractor 502, the example feature relation identifier 504, the example dominant transformation projection identifier 506, the example layout estimator 508, the example confidence level determiner 510 and/or, more generally, the example auditing system 100 of FIG. 1-5 are shown in FIGS. 6, 7 and 8. In this example, the machine readable instructions comprise a program for execution by a processor such as the processor 912 and/or the processor 1012 shown in the example processor platforms 900, 1000 discussed below in connection with FIGS. 9 and 10. The program may be embodied in software stored on a tangible computer readable storage medium such as a CD-ROM, a floppy disk, a hard drive, a digital versatile disk (DVD), a Blu-ray disk, or a memory associated with the processor 912 and/or the processor 1012, but the entire program and/or parts thereof could alternatively be executed by a device other than the processor 912 or the processor 1012 and/or embodied in firmware or dedicated hardware. Further, although the example program is described with reference to the flowcharts illustrated in FIGS. 6, 7 and 8, many other methods of implementing the example automatic image recognition application 112, the example image segmentor 118, the example report generator 124, the example ROI detector 128, the example candidate product searcher 130, the example quick preview window generator 132, the example image corner detector 500, the example feature extractor 502, the example feature relation identifier 504, the example dominant transformation projection identifier 506, the example layout estimator 508, the example confidence level determiner 510 and/or, more generally, the example auditing system 100 may alternatively be used. For example, the order of execution of the blocks may be changed, and/or some of the blocks described may be changed, eliminated, or combined.

As mentioned above, the example processes of FIGS. 6, 7 and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7 and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart representative of an example method 600 for auditing a point-of-sale image, which may be implemented at least in part by machine readable instructions executed by the example auditing system of FIG. 1. The example method 600 corresponds to a workflow for performing a product audit of the image 104, for example. At block 602 of the example method 600, the automatic image recognition application 112 analyzes the captured image 104 and attempts to identify the products 108a-108n in the captured imaged 104. The image segmentor 118, at block 604, segments or divides the captured image 104 into one or more frames 202a-202n to create the segmented image 200.

At block 606, the example method 600 includes determining whether there is an unrecognized product in the segmented image 200. For example, an auditor may view the segmented image 200 on the user interface 122. If, for example, the auditor determines that all of the products 108a-108n in the segmented image 200 have been recognized (block 606), the method 600 ends. However, as mentioned above, in some instances the automatic image recognition application 112 and/or the image segmentor 118 does not recognize all of the products 108a-108n in the captured image 104. When reviewing the segmented image 200, the auditor may see that one of the products (e.g., the product 108g of FIG. 2C) in the segmented image 200 has not been recognized.

If there is an unrecognized product (block 606), the example method 600 at block 608 includes identifying the ROI 210. For example, as illustrated in FIGS. 2C and 2D, the auditor may create the frame 202g (e.g., by drawing a boundary) around the ROI 210. In such examples, at block 608 the ROI detector 128 detects the ROI 210 identified by the auditor for which the candidate product searcher 130 searches for candidate products that potentially match a product depicted in the ROI 210, as disclosed in further detail herein. For example, at block 610, the candidate product searcher 130 performs a confidence search to identify one or more candidate products that may appear in the ROI 210. An example process for performing a confidence search to identify candidate products is illustrated in the example flowchart of FIG. 7 and discussed in further detail herein.

At block 612, the candidate product searcher 130 assigns one of the candidate products 304a-304n to the product(s) in the ROI 210. For example, as illustrated in FIG. 3, the first candidate product 304a is automatically matched or assigned by the candidate product searcher 130 as identifying the product in the ROI 210 (e.g., because it is associated with the highest confidence level). In other examples, other ones of the candidate products 304a-304n may be assigned.

At block 614, the example method includes determining whether the product depicted in the ROI 210 is identified correctly. The auditor may view the name of the recognized (e.g., assigned, matched) product in the frame 202g depicted over the ROI 210. If the product is identified correctly, the example method 600 includes again determining whether there is another unrecognized product in the segmented image 200. Otherwise, if the product is not identified correctly, the example candidate products 304a-304n may be displayed or presented to the auditor at block 616. For example, the quick preview window generator 132 generates the quick preview window 300 to be displayed simultaneously as the ROI 210 (e.g., over a section of the segmented image 200 adjacent the ROI 210). The quick preview window 300 includes the candidate section 302, which displays the candidate products 304a-304n returned from the confidence search. In some examples, the quick preview window 300 is displayed when an auditor selects the frame 202g. In other examples, the quick preview window 300 is automatically displayed after the confidence search is performed.

At block 618, the example method 600 includes selecting one of the candidate products 304a-304n as matching the product 108g in the ROI 210. For example, referring to FIG. 3, an auditor may select (e.g., via a mouse click) the second candidate product 304b in the candidate section 302 to assign to the second candidate product 304b to the ROI 210 (e.g., to the product depicted in the ROI 210). At block 620, the match record stored in the match database 120 is updated to reflect the change in the reference product assigned to the ROI 210. The example method 600 again includes determining whether there is another unrecognized product at block 606. If there is another unrecognized product, the example method 600 continues. This cycle may be repeated any number of times until all of the products in the segmented image 200 have been recognized and/or are verified as correct. Otherwise, the example method 600 ends.

FIG. 7 is a flowchart representative of an example method 700 to perform a confidence search, which may correspond to the processing performed at block 610 of FIG. 6. The example method 700 of FIG. 7 includes machine readable instructions that may be executed to implement and/or executed by the example candidate product searcher 130 of FIGS. 1 and 5 and/or, more generally, the example auditing system 100 of FIG. 1, for example.

At block 702 of FIG. 7, the example image corner detector 500 detects the corners of the ROI 210. The corners of an image may contain meaningful pixels, for example. In some examples, the image corner detector 500 uses an OAST to detect the corners of the ROI 210. However, in other examples, other image corner detection techniques may be employed. At block 704 of the example method 700, the example feature extractor 502 extracts and/or describes the features (e.g., which may be included in the corners) and/or the corners detected by the image corner detector 500 (e.g., at block 702). In some examples, each feature corresponds to a 5×5 window of normalized row pixel values in grayscale.

At block 706, the example image corner detector 500 detects corners of a reference image (e.g., a pattern) stored in the product database 114. The image corner detection may be performed similar to block 702. In some examples, the image corner detector 500 uses the OAST to detect the corners of the reference image. At block 708, the example feature extractor 502 extracts and/or describes features and/or the corners detected by the image corner detector 500. The feature extraction may be performed similar to block 704.

At block 710, the example feature relation identifier 504 compares the features extracted from the ROI 210 to the features extracted from the reference image to determine or identify any features that are similar (e.g., match). Features that are similar are identified and characterized by a relationship. In some examples, not all relationship are compatible. Therefore, a metric, such as the Person product-moment correlation coefficient, may be applied to determine if the relationship is compatible or not. At block 712 of FIG. 7, the example dominant transformation projection identifier 506 identifies the dominant transformation projection, which includes calculating or determining a mathematical formula or function that transforms the features between the ROI 210 and the reference image. In other words, the dominant transformation projection can translate a point from the ROI 210 to the reference image, or vice versa. In some examples, an RANSAC algorithm is used. In some examples, the example dominant transformation projection identifier 506 identifies the most important or influential match or relationship.

At block 714 in FIG. 7, the layout estimator 508 determines or estimates the layout (e.g., configuration, arrangement) of the reference product in the ROI 210. In some examples, the dominant transformation projection is a scale of the reference image, which is then used by the example layout estimator 508 to determine the layout of the reference product (e.g., in rows and columns), in the ROI 210.

At block 716, the confidence level determiner 510 identifies the number of features (e.g., inliers) that are compatible within the dominant transformation projection. Based on the number of inliers, the confidence level determiner 510 determines (e.g., measures) the confidence level of the candidate product image associated with the reference product image (e.g., the reference product). At block 718, the example method 700 includes determining whether there is another reference image (e.g., a pattern) to analyze. In the illustrated example of FIG. 7, the process of comparing the extracted features of the ROI image 210 to a reference image may be repeated for another reference image, and so on (block 718). Once the reference images are analyzed, the example candidate product searcher 130 sorts the candidate products 304a-304n by their respective confidence levels (block 720), which may then be presented to the auditor via the quick preview window 300, as disclosed herein. The candidate products 304a-304n may be displayed in order of highest confidence level to lowest confidence level, or vice versa. In some examples, the confidence levels are displayed adjacent the candidate products 304a-304n.

FIG. 8 is flowchart representative of an example method 800 for displaying product information associated with a detected product and updating a record of the respective product, which may be implemented at least in part by machine readable instructions executed by the example auditing system of FIG. 1. The example method 800 may correspond to a workflow for performing a product audit of the segmented image 200, for example. In general, the example method 800 is described in connection with the segmented image 200 illustrated in FIG. 2. However, the example method may similarly be performed on the segmented image 400 illustrated in FIG. 4.

At block 802 of FIG. 8, the example automatic image recognition application 112 analyzes the captured image 104 and attempts to identify the products 108a-108n in the captured imaged 104. The image segmentor 118, at block 804, segments or divides the captured image 104 into the one or more frames 202a-202n to create the segmented image 200. In some examples, as disclosed herein, the segmented image 200 may be further segmented based on user input. For example, an auditor may identify an ROI in the segmented image 200, and a frame may be displayed around the ROI, as described in connection with the methods 600 and 700 of FIGS. 6 and 7.

At block 806, the segmented image 200 is displayed via the user interface 122. At block 808, the example quick preview window generator 132 renders the quick preview window 300 to display product information simultaneously with the product 108g of the ROI 210. In some examples, the quick preview window 300 is displayed in response to user input (e.g., the auditor selects the frame 202g and/or the ROI 210). As illustrated in FIG. 3, the quick preview window 300 displays product information associated with the recognized product. The quick preview window 300 may be displayed adjacent (e.g., near) the selected ROI 210 (e.g., over a section of the segmented image 200). The product information may include, for example, the reference image 308 of the recognized product, the name 310 of the recognized product, the view 312 of the recognized product, the number of facings 314 (e.g., including a number of rows and columns of the facings), the stock information 320, the pallet information 322, the metric information 324, the price information 326 related to the recognized product and/or the range 328 of the price of the recognized product. In other examples, other product information may be displayed. The quick preview window 300 displays (e.g., presents) product information relating to the matched product assigned to the product 108g in the corresponding frame 202g and/or ROI 210. Additionally or alternatively, the quick preview window 300 may display candidate products. In some examples, the candidate products 304a-304n may be obtained via the candidate product searcher 130, for example. In other examples, the candidate products are based on reference products identified during the automatic image recognition process (at block 802) as potentially matching the first product (e.g., as in the segmented image 400 of FIG. 4). In some examples, the candidate products are obtained using a string comparison algorithm and sorted by frequency of appearance. For example, if information about the automatic image recognition process is not provided, a string comparison may be used to identify candidate products. For instance, if the assigned product is "COCA COLA 500ML," the auditing system 100 may search the product database 114 for products containing "COCA," "COLA," and/or "500ML," and the results (e.g., the candidate products bearing these terms) may be sorted by frequency of appearance (e.g., from most frequent reference product to least frequent). Additionally, in some examples, characteristic information of the store (e.g., the retail store or merchant) may be used to filter reference products (e.g. based a product category, such as beers, fruit juices, etc.).

At block 810, the example method 800 includes determining whether the product information is correctly identified. If the product information is correct, the example method 800 includes determining whether there is another product to review at block 812. Otherwise, if the product information is not correctly identified, at block 814 the example method 800 includes changing (e.g., modifying, adjusting, alternating, etc.) the product information. For example, if the view information 312 is incorrectly identified, the auditor may change the view information 312 in the quick preview window 300 (e.g., by selecting another view from a dropdown menu).

In some examples, the quick preview window 300 displays the metric information 324, which may include instructions or warnings regarding potential errors in the product information. For example, the auditing system 100 may analyze the options or information chosen by the auditor and determine if there are any potential errors associated with product information. If so, warnings may be displayed to indicate the potential errors in the product information.

At block 816, the example auditing system 100 updates the product record in the match database 120 for the product identified in the segmented image 200. In some examples, the example report generator 124 generates the report 126 (e.g., an audit) of the products (and related information) identified in the captured image 104. At block 812, the auditor determines if there are more products/results to review in the segmented image. If so, the example method 800 advances to block 806 again. This process may be repeated any number of times (e.g., until all products are correctly identified in the segmented image 300). The example method 800 results in a consistent quality and accuracy of the audits performed by auditors.

Figure 9:
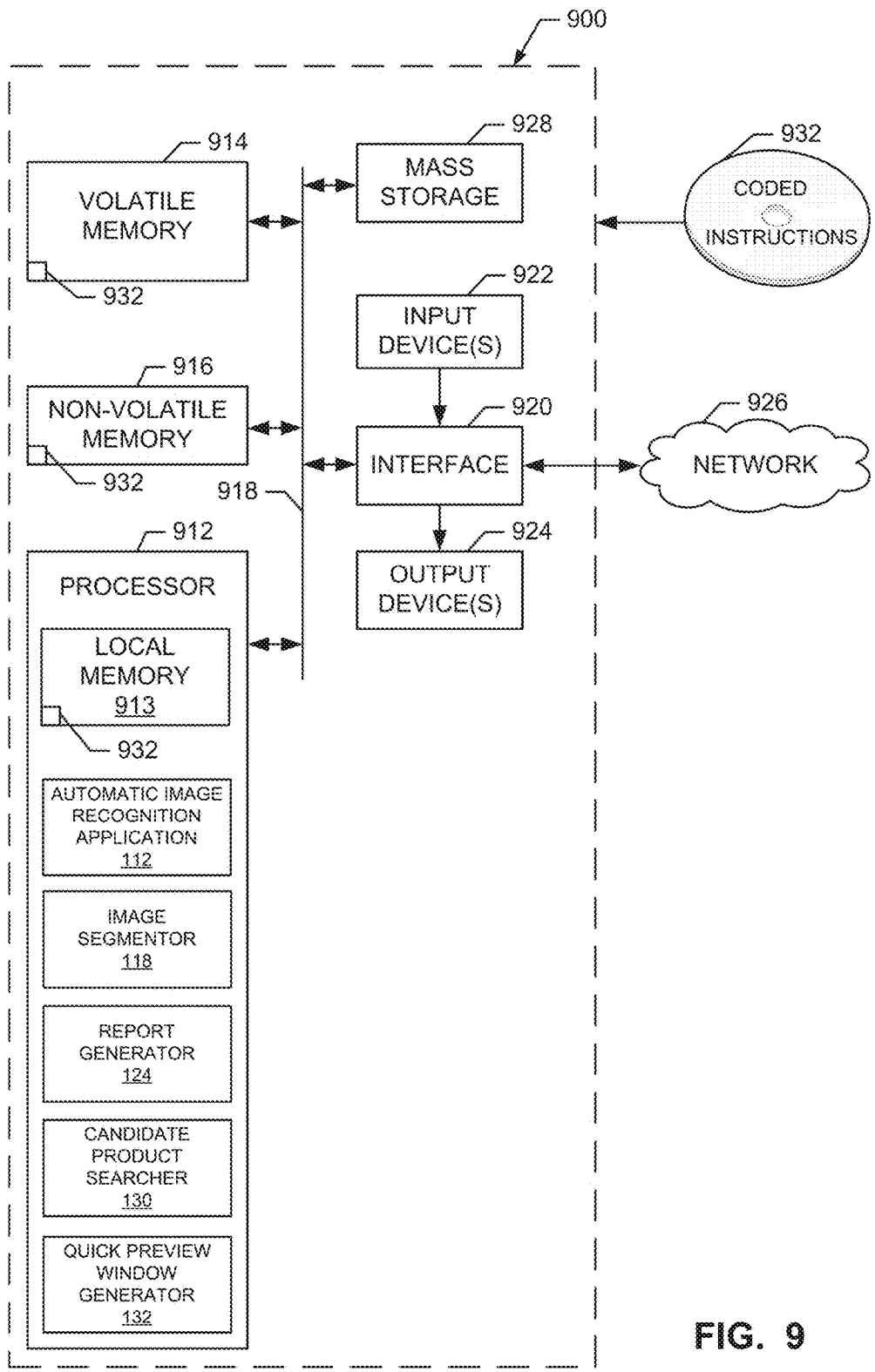
FIG. 9 is a block diagram of an example processor system structured to execute example machine readable instructions represented by FIGS. 6, 7 and/or 8 to implement the example auditing system of FIG. 1.

FIG. 9 is a block diagram of an example processor platform 900 capable of executing instructions of FIGS. 6, 7 and 8 to implement the example system 100 of FIG. 1. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 6, 7 and 8 may be stored in the mass storage device 928, in the volatile memory 914, in the non-volatile memory 916, and/or on a removable tangible computer readable storage medium such as a CD or DVD.

Figure 10:
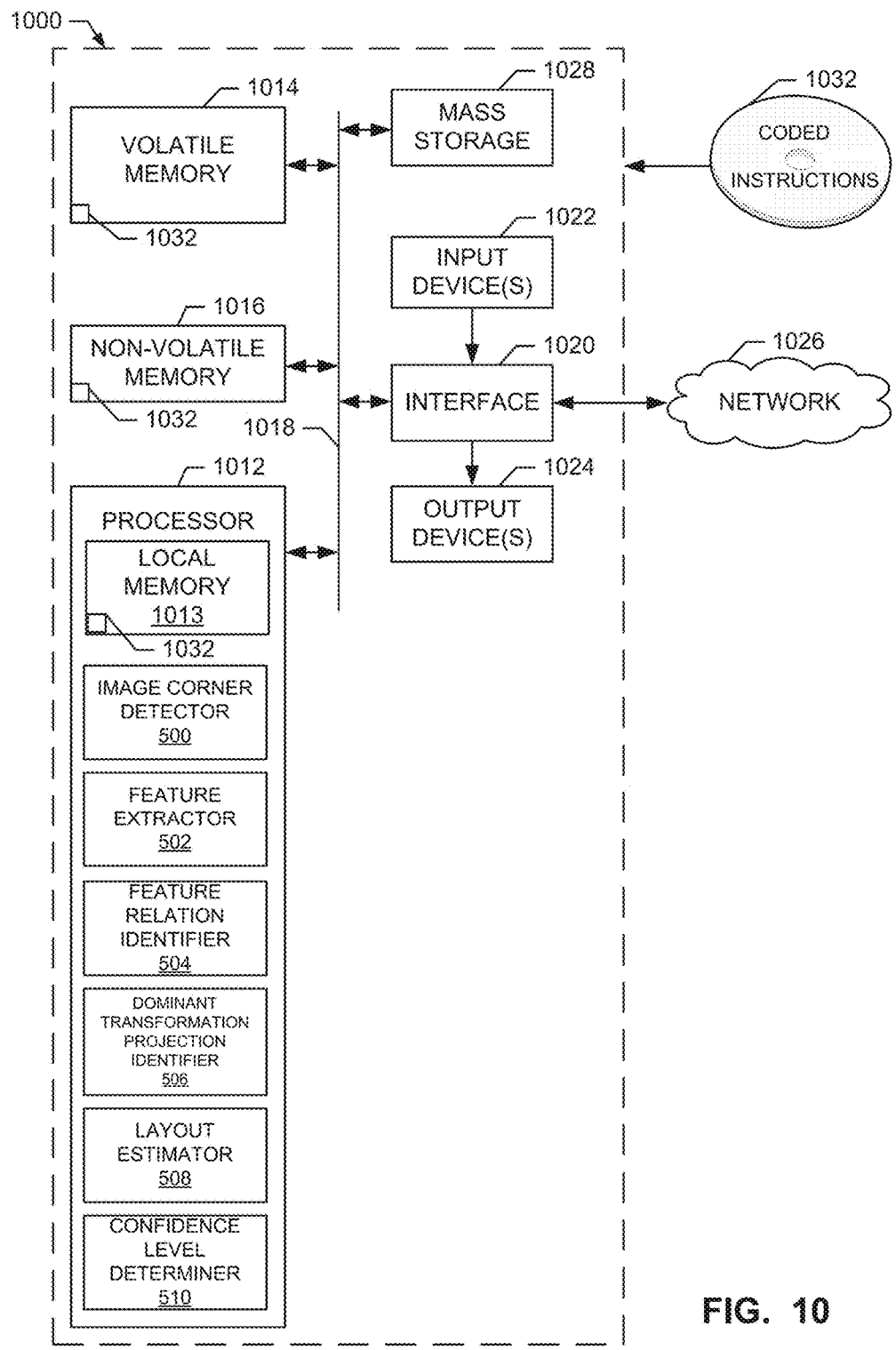
FIG. 10 is a block diagram of an example processor system structured to execute example machine readable instructions represented by FIG. 7 to implement the example candidate product searcher of FIGS. 1 and 5.

FIG. 10 is a block diagram of an example processor platform 1000 capable of executing instructions of FIG. 7 to implement the example candidate product searcher 130 of FIGS. 1 and 5. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIG. 7 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus/systems and articles of manufacture enable an auditor or operator to more quickly and efficiently perform an audit of a point-of-sale image. The examples disclosed herein may be used to perform a confidence search of an ROI and present a plurality of candidate products to the auditor, thereby allowing the auditor to more quickly and accurately (e.g., and with more confidence) select a candidate product as corresponding to a product in the ROI. The examples disclosed herein also enable an auditor to view and modify product information related to the segments or frames of a segmentation produced during an automatic image recognition process, further reducing the time spent by an auditor performing an audit of a point-of-sale image. As a result, the examples disclosed herein produce higher quality data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
analyzing, by executing an instruction with a processor, a first image with an automatic image recognition process to identify products in the first image;
displaying, via a user interface, the first image with indications of the products identified in the first image by the automatic image recognition process;
subsequent to the analyzing of the first image with the automatic image recognition process, comparing, by executing an instruction with the processor, a region of interest of the first image displayed via the user interface with a plurality of reference product images stored in a database to identify a plurality of candidate product images from the plurality of reference product images as potential matches to a first product depicted in the region of interest, the candidate product images being associated with respective confidence levels indicating respective likelihoods of matching the first product;
displaying, via the user interface, the candidate product images simultaneously with the first image in a manner based on the respective confidence levels; and
automatically selecting, by executing an instruction with the processor, a first one of the candidate product images as matching the first product based on the respective confidence levels.

2. The method of claim 1, wherein the comparing of the region of interest with the plurality of reference product images includes:
detecting first corners of the region of interest;
extracting first features from the detected first corners of the region of interest;
detecting second corners of a first reference product image of the plurality of reference product images;
extracting second features from the detected second corners;
determining relations between the first features and the second features; and
determining a dominant transformation projection between the region of interest and the first reference product image based on the relations.

3. The method of claim 2, further including:
determining a number of inliers of the first features based on the dominant transformation projection; and
determining a first one of the respective confidence levels associated with the first reference product image based on the number of the inliers.

4. The method of claim 1, wherein the displaying of the indications includes displaying the first image as a segmented image including one or more frames corresponding to respective products identified in the first image by the automatic image recognition process, the one or more frames including respective product names overlaying the respective products identified in the respective frames.

5. The method of claim 1, wherein the candidate product images are displayed in order of the respective confidence levels.

6. The method of claim 1, further including displaying values representative of the respective confidence levels adjacent to the candidate product images.

7. The method of claim 1, further including displaying the first one of the candidate product images in a manner indicating the first one of the candidate product images has been selected as being matched to the first product.

8. An apparatus comprising:
a product database storing a plurality of reference product images;
an automatic image recognition application to identify products in a first image;
a candidate product searcher to:
subsequent to operation of the automatic image recognition application, compare a region of interest of the first image with the plurality of reference product images to identify a plurality of candidate product images from the plurality of reference product images as potential matches to a first product depicted in the first image, the plurality of candidate product images being associated with respective confidence levels indicating respective likelihoods of matching the first product; and
automatically select a first one of the candidate product images as matching the first product based on the respective confidence levels; and
a user interface to:
display the first image and one or more frames corresponding to respective products identified by the automatic image recognition application, the one or more frames including respective product names overlaying the respective products identified in the respective frames; and
display the candidate product images identified by the candidate product searcher simultaneously with the first image in a manner based on the respective confidence levels.

9. The apparatus of claim 8, wherein, to compare the region of interest with the plurality of reference product images, the candidate product searcher is to:
detect first corners of the region of interest;
extract first features from the detected first corners of the region of interest;
detect second corners of a first reference product image of the plurality of reference product images;
extract second features from the detected second corners;
determine relations between the first features and the second features; and
determine a dominant transformation projection between the region of interest and the first reference product image based on the relations.

10. The apparatus of claim 9, wherein the candidate product searcher is further to:
determine a number of inliers of the first features based on the dominant transformation projection; and
determine a first one of the respective confidence levels associated with the first reference product image based on the number of the inliers.

11. The apparatus of claim 8, wherein, to compare the region of interest of the first image with the plurality of reference product images to identify the plurality of candidate product images, the candidate product searcher is to:
assign the respective confidence levels to the reference product images; and
compare the respective confidence levels associated with the reference product images to a threshold.

12. The apparatus of claim 8, wherein the candidate product images are displayed in order of the respective confidence levels.

13. The apparatus of claim 8, wherein the user interface is further to display values representative of the respective confidence levels adjacent to the candidate product images.

14. A tangible machine readable storage medium comprising instructions that, when executed, cause a machine to at least:
- execute an automatic image recognition process to identify products in a first image;
- display, via a user interface, the first image with indications of the products identified in the first image by the automatic image recognition process;
- subsequent to execution of the automatic image recognition process, compare a region of interest of the first image with a plurality of reference product images stored in a database to identify a plurality of candidate product images from the plurality of reference product images as potential matches to a first product depicted in the first image, the candidate product images being associated with respective confidence levels indicating respective likelihoods of matching the first product;
- display, via the user interface, the candidate product images simultaneously with the first image in a manner based on the respective confidence levels; and
- automatically select a first one of the candidate product images as matching the first product based on the respective confidence levels.

15. The tangible machine readable storage medium of claim 14, wherein, to compare the region of interest with the plurality of reference product images, the instructions, when executed, cause the machine to:
- detect first corners of the region of interest;
- extract first features from the detected first corners of the region of interest;
- detect second corners of a first reference product image of the plurality of reference product images;
- extract second features from the detected second corners;
- determine relations between the first features and the second features; and
- determine a dominant transformation projection between the region of interest and the first reference product image based on the relations.

16. The tangible machine readable storage medium of claim 15, wherein the instructions, when executed, further cause the machine to:
- determine a number of inliers of the first features based on the dominant transformation projection; and
- determine a first one of the respective confidence levels associated with the first reference product image based on the number of the inliers.

17. The tangible machine readable storage medium of claim 14, wherein the instructions, when executed, further cause the machine to at least one of create a record or update the record to indicate the first product matched the first one of the candidate product images.

18. The tangible machine readable storage medium of claim 14, wherein the candidate product images are displayed in order of the respective confidence levels.

19. The tangible machine readable storage medium of claim 14, wherein the instructions, when executed, further cause the machine to display, via the user interface, values representative of the respective confidence levels adjacent to the candidate product images.

20. The tangible machine readable storage medium of claim 14, wherein the instructions, when executed, further cause the machine to display, via the user interface, the first one of the candidate product images in a manner indicating the first one of the candidate product images has been selected as being matched to the first product.

* * * * *